United States Patent [19]

Ozaki et al.

[11] Patent Number: 5,107,068

[45] Date of Patent: Apr. 21, 1992

[54] POLYURETHANE RESIN AND UTILIZATION THEREOF

[75] Inventors: Satoshi Ozaki; Tsukuru Izukawa; Haruhiko Kawakami, all of Nagoya; Takayoshi Masuda, Tokai; Seiji Esaki, Yokohama; Masayuki Kimura, Yokohama; Toshio Nozawa, Yokohama, all of Japan

[73] Assignee: Mitsui Toatsu Chemicals, Inc., Tokyo, Japan

[21] Appl. No.: 515,839

[22] Filed: Apr. 27, 1990

[30] Foreign Application Priority Data

| May 6, 1989 [JP] | Japan | 1-112814 |
| Jun. 15, 1989 [JP] | Japan | 1-150362 |
| Jun. 29, 1989 [JP] | Japan | 1-165319 |
| Aug. 18, 1989 [JP] | Japan | 1-211284 |

[51] Int. Cl.$^5$ .................. C08G 18/28; C08G 18/14
[52] U.S. Cl. .................. 521/73; 521/131; 521/136; 521/137; 521/167; 521/174; 521/177
[58] Field of Search .................. 521/177, 174, 73, 137, 521/131, 136, 167

[56] References Cited

U.S. PATENT DOCUMENTS

| 4,102,828 | 7/1978 | Klein | 521/174 |
| 4,699,932 | 10/1987 | Fuzesi et al. | 521/129 |

FOREIGN PATENT DOCUMENTS

| 2364861 | 7/1975 | Fed. Rep. of Germany . |
| 1279287 | 11/1961 | France . |
| 1345262 | 10/1963 | France . |
| 2337743 | 8/1977 | France . |
| 934629 | 8/1963 | United Kingdom . |

OTHER PUBLICATIONS

K. W. Dietrich et al., Database Chemical Abstracts, Jan. 1989, vol. 111, No. 22, pp. 223-238.

*Primary Examiner*—John Kight, III
*Assistant Examiner*—Duc Truong
*Attorney, Agent, or Firm*—Burns, Doane, Swecker & Mathis

[57] ABSTRACT

The present invention relates to a novel polyurethane resin, a foam prepared from the resin, a preparation process of the foam, and preparation process of a rigid polyurethane foam composite having a face material. The primary object of the present invention is to provide a rigid polyurethane foam and a rigid polyurethane foam composite fitted with a face material which are prepared by using a hydrochlorofluorocarbon foaming agent having very low public hazards such as ozone layer destruction and green house phenomenon of the earth.

The above object can be achieved by using a combination of a polyether polyol initiated from a phenol resin with an alkanolamine or an aliphatic polyhydroxy compound in the production of rigid polyurethane foams.

Foams thus obtained have equivalent properties to those of foams obtained by using chlorofluorocarbons (CFC) which are conventional foaming agents.

23 Claims, No Drawings

POLYURETHANE RESIN AND UTILIZATION THEREOF

BACKGROUND OF THE INVENTION (a) Field of the Invention

The present invention relates to a polyurethane resin, a foam prepared from the resin, a preparation process of the foam, and a polyurethane foam composite fitted with a face material. In the manufacture of rigid polyurethane foams, the novel polyoxyalkylene polyol prepared according to the present invention is excellent in mutual dispersibility when the polyol is mixed with a hydrochlorofluorocarbon which can minimize environmental destruction, and has good workability. In addition, a polyurethane resin prepared by reacting the polyoxyalkylene polyol with an organic polyisocyanate in the presence of a catalyst, if necessary, has good resistance to dissolving into a hydrochlorofluorocarbon, and hence can provide extremely favorable effects. For example, the polyurethane foam prepared from the novel polyoxyalkylene polyol has excellent physical properties such as heat insulation property, strength, low temperature dimensional stability and flame resistance. Consequently, the polyurethane foam is very useful for various applications such as refrigerators, freezers, heat insulation panels and other adiabatic structural materials.

(b) Description of the Prior Art

Rigid polyurethane foam has an excellent heat insulation property and low temperature dimensional stability and thus various composites prepared therefrom are widely used for refrigerators, freezing ware houses, building wall faces, ceilings, heat insulation and structural materials for ships and vehicles, and the heat insulating and protective covers of instruments.

Further, composites containing rigid polyurethane foam formed on a sheet of face material or in a cavity surrounded by a plurality of face material have already been broadly manufactured by a batch process or a continuous process.

In the present manufacturing processes for polyurethane foams, furon, particularly chlorofluorocarbons (hereinafter abbreviated as CFC) as CFC-11 and CFC-12 are generally used as foaming agents. These compounds have recently been recognized as materials for causing environmental destruction such as disruption of ozone layer or for enhancement of green house effect. Accordingly, restrictions have recently been imposed upon the manufacture and use of these compounds.

At the same time, hydrochlorofluorocarbons (hereinafter abbreviated as HCFC) such as 2,2-dichloro-1,1,1-trifluoroethane (HCFC-123) and 1,1-dichloro-1-fluoroethane (HCFC-141b) which cause much less environmental destruction, have been the focus of attention as substitutes for CFC-11 and CFC-12. However, HCFC-123 and -141b have higher dissolving effect on polyurethane resin compared to CFC-11 and -12, and hence, have the disadvantage of severely deteriorating the properties of resulting polyurethane foams (e.g., reduction of closed cell content and foam strengths). Particularly, this is the case in the manufacture of rigid polyurethane foams. HCFC dissolves the cell wall of closed cells in the course of foaming and drastically lowers heat insulation effect which is a characteristic property of rigid polyurethane foams.

Consequently, development of novel polyurethane resins and foams which can be used in combination with HCFC has been desired. In the preparation of polyoxyalkylene polyols for use in the manufacture of conventional polyurethane resins, a polyoxyalkylene polyol obtained by the addition of alkylene oxide to novolak resin has been proposed to be used in combination with polyether polyol or polyester polyol, as disclosed in Japanese Patent Publication Nos. SHO 46-3797(1971) and SHO 47-19911(1972) and Japanese Patent Laid-Open Publication Nos. SHO 63-264616(1988) and HEI 1-135824(1989).

In any of these disclosures, novolak base polyols are singly used in order to improve flame resistance of polyurethane foams. No description has been found on the use of phenol resin in a specific combination with alkanolamine or polyoxyalkylene polyol using an aliphatic polyhydroxy compound as an starting material. Also, no disclosure has been found on the improvement of dissolving resistance of polyurethane resin to HCFC-123 and HCFC-141b and improvement of physical properties of polyurethane foams using these HCFC compounds as a foaming agent.

As mentioned above, HCFC which is much less dangerous for environmental destruction, has a strong dissolving effect on polyurethane resin and is liable to result in deterioration of foam properties and reduction of closed cell content. Consequently, satisfactory foam properties have not been obtained.

In the manufacture of rigid polyurethane foams, application of HCFC-123 or HCFC-141b as a foaming agent in place of CFC-11 leads to various unfavorable problems.

(1) Reaction rate becomes slow. As a result, when a surface to be sprayed by polyurethane liquid raw materials is not horizontally situated, the sprayed raw materials causes sagging or running on the surface prior to foaming and curing.

(2) Polyurethane foams which are obtained cause remarkable deterioration of physical properties such as low temperature dimensional stability and compressive strength.

(3) A marked increase in heat conductivity is observed on the polyurethane foam obtained.

Polyurethane foams and their composites having the above problems naturally causes reduction of quality.

SUMMARY OF THE INVENTION

The present invention relates to a novel polyurethane resin, a foam prepared from the resin, a preparation process of the foam, and preparation process of a rigid polyurethane foam composite having a face material. The primary object of the present invention is to provide a rigid polyurethane foam and a rigid polyurethane foam composite fitted with a face material which are prepared by using a hydrochlorofluorocarbon foaming agent having very low public hazards such as ozone layer destruction and green house phenomenon of the earth.

The above object can be achieved by using a combination of a polyether polyol initiated from a phenol resin with an alkanolamine or an aliphatic polyhydroxy compound in the production of rigid polyurethane foams.

Foams thus obtained have equivalent properties to those of foams obtained by using chlorofluorocarbons(CFC) which are conventional foaming agents.

DETAILED DESCRIPTION OF THE INVENTION

The present inventors have carried out an intensive investigation in order to use HCFC as a foaming agent, to solve the above various problems and to develop a novel rigid polyurethane foam having properties equivalent or superior to those of conventional rigid polyurethane foams obtained by using CFC as a foaming agent. As a result, they have developed a polyurethane resin, a polyurethane foam, and its preparation process by using the resin, and a preparation process of a polyurethane composite by using the polyurethane foam.

That is, the first aspect of the present invention is a polyurethane resin obtained by reacting an organic polyisooyanate, in the presence of a catalyst when necessary, with a combination of polyoxyalkylene polyols selected from:
polyoxyalkylene polyol (a) having a hydroxyl value of from 145 to 350 mgKOH/g and prepared by the addition of from 1.0 to 4.5 moles of an alkylene oxide to one mole of hydroxyl of a phenol resin having a number average molecular weight of from 650 to 1400 and an average functionality of from 3 to 8 and represented by the formula (I):

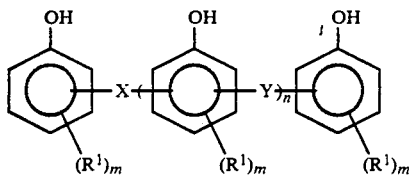

wherein $R^1$ is a hydrogen atom, alkyl having from 1 to 9 carbon atoms, halogen atom selected from chlorine, bromine and fluorine, hydroxyl, methoxy, ethoxy or a butoxyl; m is an integer of from 1 to 3; n is an integer of from 1 to 6; X is a divalent group selected from the group consisting of $-CR_1R_2-$, xylylene, oxy, thio, dithio and a sulfonyl; and Y is one or more of bridge group selected from the above divalent groups; and wherein $R_1$ and $R_2$ are a hydrogen atom, alkyl having from 1 to 6 carbon atoms, alicyclic hydrocarbon group or an aromatic hydrocarbon group;
polyoxyalkylene polyol (b) having a hydroxyl value of from 240 to 800 mgKOH/g and obtained by the addition of from 0.5 to 3.0 moles of an alkylene oxide to one atom of an active hydrogen of an alkanolamine which is a single compound or a mixture of two or more compounds selected from the group consisting of the compound represented by the formula (II):

wherein $R_1'$ and $R_2'$ are an atom or a group selected from the group consisting of a hydrogen atom, $-CH_2CH_2OH$ group, and $-CH_2CH(CH_3)OH$ group, excluding the case wherein both $R_1'$ and $R_2'$ are a hydrogen atom; and
polyoxyalkylene polyol (c) having a hydroxyl value of from 130 to 750 mgKOH/g and obtained by the addition of from 0.8 to 6.5 moles of an alkylene oxide to one mole of a hydroxyl of an aliphatic polyhydroxy compound which is a single compound or a mixture of two or more compounds selected from the group consisting of a glycol, polyhydric alcohol and a polysaccharide having from 2 to 8 functionality; wherein said combination of polyoxyalkylene polyols is a combination of (a) and (b) having a weight ratio (a)/(b) of from 0.25 to 4.0 and a hydroxyl value of from 180 to 700 mg KOH/g or a combination of (a) and (c) having a weight ratio (a)/(c) of from 0.1 to 4.0 and a hydroxyl value of from 180 to 700 mgKOH/g.

The second aspect of the present invention is a rigid polyurethane foam obtained by reacting an organic polyisocyanate, in the presence of a foaming agent, catalyst, cell regulator and other additives, with a combination of polyoxyalkylene polyols selected from:
polyoxyalkylene polyol (a) having a hydroxyl value of from 145 to 350 mgKOH/g and prepared by the addition of from 1.0 to 4.5 moles of an alkylene oxide to one mole of hydroxyl of a phenol resin having a number average molecular weight of from 650 to 1400 and average functionality of from 3 to 8 and represented by the formula (I):

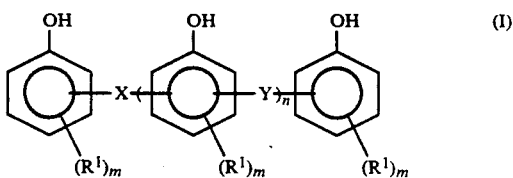

wherein $R^1$ is a hydrogen atom, alkyl having from 1 to 9 carbon atoms, halogen atom selected from chlorine, bromine and fluorine, hydroxyl, methoxy, ethoxy or a butoxy; m is an integer of from 1 to 3; n is an integer of from 1 to 6; X is a divalent group selected from the group consisting of $-CR_1R_2-$, xylylene, oxy, thio, dithio and a sulfonyl; and Y is one or more of bridge group selected from the above divalent groups; and wherein $R_1$ and $R_2$ are a hydrogen atom, alkyl having from 1 to 6 carbon atoms, alicyclic hydrocarbon group or an aromatic hydrocarbon group;
polyoxyalkylene polyol (b) having a hydroxyl value of from 240 to 800 mgKOH/g and obtained by the addition of from 0.5 to 3.0 moles of an alkylene oxide to one atom of an active hydrogen of an alkanolamine which is a single compound or a mixture of two or more compounds selected from the group consisting of the compound represented by the formula (II):

wherein $R_1'$ and $R_2'$ are an atom or a group selected from the group consisting of a hydrogen atom, $-CH_2CH_2OH$ group, and $-CH_2CH(CH_3)OH$ group, excluding the case wherein both $R_1'$ and $R_2'$ are a hydrogen atom; and
polyoxyalkylene polyol(c) having a hydroxyl vaue of from 130 to 750 mg KOH/g and obtaint by the addition of from 0.8 to 6.5 moles of an alkylene oxide to one mole of a hydroxyl of an aliphatic polyhydroxy compound which is a single compound or a mixture of two or more compounds selected from the group consisting of a glycol, polyhydric alcohol and a polysaccharide having from 2 to 8 functionality;
wherein said combination of polyoxyalkylene polyols is a combination of (a) and (b) having a weight ratio (a)/(b) of from 0.25 to 4.0 and a hydroxyl value of from 180 to 700 mgKOH/g or a combination of (a) and (c) having a weight ratio (a)/(c) of from 0.1 to 4.0 and a hydroxyl value of from 180 to 700 mgKOH/g, and said foaming agent is a hydrochlorofluorocarbon or a foaming agent mixture containing the same.

The third aspect of the present invention is a process for the preparation of a rigid polyurethane foam by reacting an organic polyisocyanate, in the presence of a foaming agent, catalyst, cell regulator and other additives, with a combination of polyoxyalkylene polyols selected from:

polyoxyalkylene polyol (a) having a hydroxyl value of from 145 to 350 mgKOH/g and prepared by the addition of from 1.0 to 4.5 moles of an alkylene oxide to one mole of hydroxyl of a phenol resin having a number average molecular weight of from 650 to 1400 and an average functionality of from 3 to 8 and represented by the formula (I):

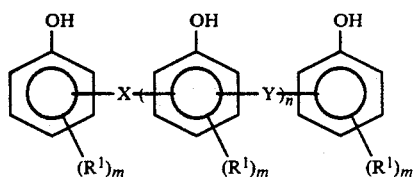

wherein $R^1$ is a hydrogen atom, alkyl having from 1 to 9 carbon atoms, halogen atom selected from chlorine, bromine and fluorine, hydroxyl, methoxy, ethoxy or a butoxy; m is an integer of from 1 to 3; n is an integer of from 1 to 6; X is a divalent group selected from the group consisting of $-CR_1R_2-$, xylylene, oxy, thio, dithio and a sulfonyl; and Y is one or more of bridge group selected from the above divalent groups; and wherein $R_1$ and $R_2$ are a hydrogen atom, alkyl having from 1 to 6 carbon atoms, alicyclic hydrocarbon group or an aromatic hydrocarbon group;

polyoxyalkylene polyol (b) having a hydroxyl value of from 240 to 800 mgKOH/g and obtained by the addition of from 0.5 to 3.0 moles of an alkylene oxide to one atom of an active hydrogen of an alkanolamine which is a single compound or a mixture of two or more compounds selected from the group consisting of the compound represented by the formula (II):

$$N R_1' R_1' R_2' \qquad (II)$$

wherein $R_1'$ and $R_2'$ are an atom or a group selected from the group consisting of a hydrogen atom, $-CH_2CH_2OH$ group, and $-CH_2CH(CH_3)OH$ group, excluding the case wherein both $R_1'$ and $R_2'$ are a hydrogen atom; and polyoxyalkylene polyol (c) having a hydroxyl value of from 130 to 750 mgKOH/g and obtaind by the addition of from 0.8 to 6.5 moles of an alkylene oxide to one mole of a hydroxyl of an aliphatic polyhydroxy compound which is a single compound or a mixture of two or more compounds selected from the group consisting of a glycol, polyhydric alcohol and a polysaccharide having from 2 to 8 functionality; wherein said combination of polyoxyalkylene polyols is a combination of (a) and (b) having a weight ratio (a)/(b) of from 0.25 to 4.0 and a hydroxyl value of from 180 to 700 mgKOH/g or a combination of (a) and (c) having a weight ratio (a)/(c) of from 0.1 to 4.0 and a hydroxyl value of from 180 to 700 mgKOH/g, and said foaming agent is hydrochlorofluorocarbon or a foaming agent mixture containing the same.

The fourth aspect of the present invention is a process for the preparation of a rigid polyurethane foam composite by spraying a mixture of raw materials on a substrate or pouring thereof into a cavity surrounded with a plurality of face material and successively reacting an organic polyisocyanate, in the presence of a foaming agent, catalyst, cell regulator and other additives, with a combination of polyoxyalkylene polyols selected from:

polyoxyalylene polyl (a) having a hydroxyl value of from 145 to 350 mgKOH/g and prepared by the addition of from 1.0 to 4.5 moles of an alkylene oxide to one mole of hydroxyl of a phenol resin having a number average molecular weight of from 650 to 1400 and an average functionality of from 3 to 8 and represented by the formula (I):

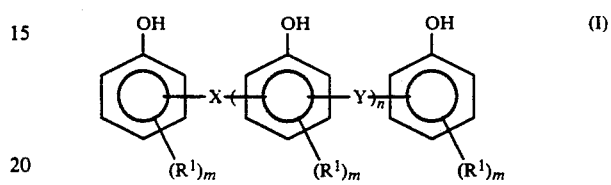

wherein $R^1$ is a hydrogen atom alkyl having from 1 to 9 carbon atoms, halogen atom selected from chlorine, bromine and fluorine, hydroxyl, methoxy, ethoxy or a butoxy; m is an integer of from 1 to 3; n is an integer of from 1 to 6; X is a divalent group selected from the group consisting of $-CR_1R_2-$, xylylene, oxy, thio, dithio and a sufonyl; and Y is one or more of bridge group selected from the above divalent groups; and wherein $R_1$ and $R_2$ are a hydrogen atom, alkyl having from 1 to 6 carbon atoms, alicylic hydrocarbon group or an aromatic hydrocarbon group;

polyoxyalkylene polyol (b) having a hydroxyl value of from 240 to 800 mgKOH/g and obtained by the addition of from 0.5 to 3.0 moles of an alkylene oxide to one atom of an active hydrogen of an alkanolamine which is a single compound or a mixture of two or more compounds selected from the group consisting of the compound represented by the formula (II):

$$N R_1' R_1' R_2' \qquad (II)$$

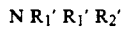

wherein $R_1'$ and $R_2'$ are an atom or a group selected from the group consisting of a hydrogen atom, $-CH_2CH_2OH$ group, and $-CH_2CH(CH_3)OH$ group, excluding the case wherein both $R_1'$ and $R_2'$ are hydrogen atom; and polyoxyalkylene polyol (c) having a hydroxyl value of from 130 to 750 mgKOH/g and obtained by the addition of from 0.8 to 6.5 moles of an alkylene oxide to one mole of a hydroxyl of an aliphatic polyhydroxy compound which is a single compound or a mixture of two or more compounds selected from the group consisting of a glycol, polyhydric alcohol and a polysaccharide having from 2 to 8 functionality;

wherein said combination of polyoxyalkylene polyols is a combination of (a) and (b) having a weight ratio (a)/(b) of from 0.25 to 4.0 and a hydroxyl value of from 180 to 700 mgKOH/g or a combination of (a) and (c) having a weight ratio (a)/(c) of from 0.1 to 4.0 and a hydroxyl value of from 180 to 700 mgKOH/g, and said foaming agent is a hydrochlorofluorocarbon or a foaming agent mixture containing the same.

[1] Polyurethane resin

The polyurethane resin of the invention was mentioned in the first aspect above and will also be referred to in the claims below.

The polyurethane resin herein described naturally include subjects described in sections [2] to [4] below except foaming agents and cell regulators.

The phenol resin which is used for the present invention is represented by the formula (I):

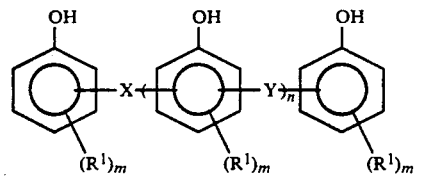

wherein X, Y, $R^1$, m and n are the same as above, and include, for example, reaction products of phenols such as phenol, cresol, butylphenol, nonylphenol, chlorophenol, resorcinol, hydroquinone, catechol, guaiacol, bisphenol A or bisphenol S; with aldehydes such as formaldehyde or acetaldehyde, $\alpha,\alpha'$-dimethoxyxylene, $\alpha,\alpha'$-dichloroxylene or sulfur. The reaction is carried out by known methods.

A preferred phenol resin is a novolak resin and has a number average molecular weight (Mn) of 650 to 900, average functionality (f) of 3 to 8, and a softening point of 75° to 115° C.

The alkylene oxide used for the present invention includes, for example, ethylene oxide, propylene oxide and butylene oxide. The alkylene oxide may be used singly or in combination.

When mole numbers of alkylene oxide addition are increased, resistance to furon is generally decreased.

When (Mn) of the phenol resin is less than 650, the polyurethane resin derived from the phenol resin dissolves in HCFC, even though number of addition is 1 mole per mole of hydroxyl group in the phenol resin. For example, the above polyurethane resin exhibits the above tendency when minimum amount, 0.5 mole, of alkylene oxide is added to alkanolamine (b) and the above mentioned weight ratio (a)/(b) is changed in the range of 0.25 to 4.0, or when minimum amount, 0.8 mole, of alkylene oxide is added to the aliphatic polyhydroxy compound (c) and the above mentioned weight ratio (a)/(c) is changed in the range of 0.1 to 4.0.

On the other hand, a (Mn) of the phenol resin exceeding 1400 leads to high viscosity in any mixing ratio, poor dispersibility in HCFC, inferior workability in reaction, complex handling procedures required for uniform admixture with other polyoxyalkylene polyol or organic polyisocyanate, poor resistance of resulting polyurethane resin to HCFC, and other unfavorable results even though low viscosity materials are selected as other components.

The polyoxyalkylene polyol (a) of the invention is obtained by the addition of 1.0 to 4.5 moles of alkylene oxide to 1 mole of the hydroxyl group in the phenol resin. Alkylene oxide of less than 1.0 mole, that is, much amount of phenolic hydroxyl group remained causes unfavorable reduction of physical properties in the resulting polyurethane foam. On the other hand, alkylene oxide addition exceeding 4.5 mole eliminates HCFC resistance of resulting polyurethane resin, although viscosity is reduced and dispersibility in HCFC-123 and -141b becomes better.

When the phenol resin has an average functionality (f) of less than 3, the resulting polyurethane resin made from (a) and (b) or (c) decreases resistance to HCFC.

On the other hand, (f) exceeding 8 leads to a disadvange of rendering the polyurethane resin brittle The alkanolamine for use in the invention is represented by the formula (II):

$$N\ R_1'\ R_1'\ R_2' \qquad (II)$$

wherein $R_1'$ and $R_2'$ are the same as above, and includes, for example, monoethanolamine, diethanolamine, triethanolamine, monoisopropanolamine, diisopropanolamine and triisopropanolamine.

The polyoxyalkylene polyol (b) used in the invention is obtained by the addition of 0.5 to 3.0 moles of alkylene oxide to 1 atom of active hydrogen in the alkanolamine.

When the amount of alkylene oxide is less than 0.5 mole per atom of active hydrogen of alkanolamine, crosslinking activity of alkanolamine remains and also deteriorates physical properties of resulting polyurethane foam. The amount of alkylene oxide exceeding 3.0 moles also decreases foam properties even in a polyol mixing ratio (a)/(b) of above 4.0 and the resulting polyurethane foam cannot be practically used.

The polyoxyalkylene polyols (a) and (b) used in the invention are preferably used in a mixing ratio (a)/(b) of 0.25 to 4.0 by weight. The mixing ratio exceeding 4.0 causes high viscosity and poor dispersibility in HCFC-123 and HCFC-141b and also leads to unfavorable operation problems on the preparation of polyurethane resin. On the other hand, the mixing ratio less than 0.25 is unsuitable because of the inferior properties of resulting polyurethane foams.

The aliphatic polyhydroxy compound used for the present invention is a single compound or a mixture of two or more compounds selected from the group consisting of a glycol having 2 to 8 functionality, polyhydric alcohol and a polysaccharide. Exemplary aliphatic polyhydroxy compound includes glycols such as ethylene glycol diethylene glycol, propylene glycol, dipropylene glycol, butanediol, neopentyl glycol, cyclohexane dimethanol and cyclohexane tetramethanol; polyhydric alcohols such as glycerol, trimethylolethane, trimethylolpropane, and pentaerythritol; and polysaccharides such as methylglucoside, sorbitol, mannitol, dulcitol and sucrose.

Preferred mole numbers of alkylene oxide addition is from 0.8 to 6.5 moles per mole of the hydroxyl in the aliphatic polyhydroxy compound. Alkylene oxide addition of less than 0.8 mole makes resultant polyurethane foam brittle. On the other hand, addition exceeding 6.5 moles lowers HCFC resistnace of the polyurethane resin obtained.

The polyoxyalkylene polyols (a) and (c) ar preferably mixed in the ratio (a)/(c) of 0.1 to 4.0 by weight. The mixing ratio less than 0.1 reduces HCFC resistance of polyurethane resin prepared by reacting in the presence of a catalyst. On the other hand, the mixing ratio exceeding 4.0 leads to a disadvantage of poor workability due to too high viscosity in the preparation of polyurethane resin.

The catalyst used for the preparation of polyoxyalkylene polyols (a), (b) and (c) is an amine compound represented by the formula (III) or formula (IV):

$$N\ R''\ R_1''\ R_2'' \qquad (III)$$

$$R_1''\ R_2''\ N(CH_2)n\ N\ R_1''\ R_2'' \qquad (IV)$$

wherein $R_1''$ is an hydrogen atom, alkyl having from 1 to 6 carbon atoms, $-CH_2CH_2OH$ group or $-CH_2CH(CH_3)OH$ group, $R_2''$ is a hydrogen atom, alkyl having from 1 to 4 carbon atoms, $-CH_2CH_2OH$ group or $-CH_2CH(CH_3)OH$ group, n is an integer of from 1 to 6, excluding $R_1''$ and $R_2''$ are hydrogen atoms in the formula (III).

An exemplary amine compound includes, dibutylamine, ethylenediamine, tetramethylenediamine, monoethanolamine, diethanolamine, triethanolamine, isopropanolamine, triethylamine, tri-n-propylamine, di-n-propylamine, n-propylamine, n-amylamine, N,N-dimethylethanolamine, isobutylamine, isoamylamine and methyldiethylamine.

Alkali hydroxide can also be used as a catalyst for the preparation of the above polyoxyalkylene polyols. Alkali hydroxide which can be used include, for example, lithium hydroxide, sodium hydroxide, potassium hydroxide, magnesium hydroxide, calcium hydroxide, and barium hydroxide.

The above mentioned catalysts may be used singly or as mixtures.

The organic polyisocyanate used in the present invention is a conventionally known polyisocyanate. No particular restriction is imposed upon the organic polyisocyanate.

Exemplary polyisocyanates are aromatic, aliphatic and alicyclic polyisocyanates, modified polyisocyanates, and dimers and trimers of polyisocyanates, and include diphenylmethanediisocyanate, crude diphenylmethanediisocyanate, tolylenediisocyanate, crude tolylenediisocyanate, xylylenediisocyanate, hexamethylenediisocyanate, isophorondiisocyanate, hydrogenated diphenylmethanediisocyanate, hydrogenated tolylenediisocyanate, triphenylmethanetriisocyanate, tolylenetriisocyanate, urethidione, isocyanurate, modified diphenylmethanediisocyanate, and carbodiimide modified diphenylmethanediisocyanate. Isocyanate group terminated prepolymers obtained by reacting excess amount of the above polyisocyanate with polyols (e.g. low molecular weight polyol or polymer polyol) in an equivalent ratio of NCO/active hydrogen which is in the range of from 2.0 to 5.0 and having an isocyanate content of 5 to 35% by weight can also be used as a polyisocyanate.

The above polyisocyanates may be used singly or in combinations. The organic polyisocyanate is used in an amount so that the equivalent ratio of the isocyanate group to the active hydrogen atom in the resin premix (NCO-index) is in the range of generally from 0.8 to 5.0, preferably from 0.9 to 2.0 and more preferably from 1.0 to 1.2.

[2] Polyurethane foam

The polyoxyalkylene polyol, organic polyisocyanate and other additives described in the foregoing section and following sections can naturally be applied to this section.

In preparing rigid polyurethane foam, the polyoxyalkylene polyols of this invention are mixed and then the catalyst, cell regulator, foaming agent and other additives are added to prepare a premix. The mixture of polyoxyalkylene polyol of this invention has good compatibility with HCFC used. Consequently, a premix composition containing polyoxyalkylene polyol and HCFC gives a homogeneous and stable mixture and can be stored for a long period of time. In the foaming operation, the premix composition can be very rapidly and uniformly mixed with polyisocyanate component by high speed stirring or atomization. Thus, rigid polyurethane foams having excellent physical properties can be obtained.

HCFC vaporizes by exothermic reaction, expands the rigid polyurethane foams and partially escapes into the air. Residual HCFC in the rigid polyurethane foam obtained is also gradually released from the rigid foam into the air during use. However, HCFC scattered into the air causes much less public hazards such as ozone layer destruction as compared to CFC, which is a remarkable characteristic of the present invention.

When necessary, a portion of the polyoxyalkylene polyol (a) or a portion of the polyoxyalkylene polyols (a) and (c) can be previously reacted to form a prepolymer. A residual portion of the polyoxyalkylene polyols is used for preparing the resin premix. The prepolymer and the premix thus obtained are then reacted to form rigid polyurethane foam. Preparation of the prepolymer is carried out by reacting the whole amount of polyisocyanate with the portion of polyoxyalkylene polyols at 60° to 100° C. for 2 to 3 hours.

The polyoxyalkylene polyol used for the present invention is prepared by the addition of alkylene oxide to a mixture of above mentioned starting materials having two or more active hydrogen atoms in a molecule. Preferred hydroxyl value of the polyoxyalkylene polyol thus obtained is in the range of 180 to 700 mgKOH/g.

Alternatively, each of the polyoxyalkylene polyol (a), (b) and (c) may be separately prepared by the addition of alkylene oxide to each starting materials and thereafter may be mixed. That is, polyoxyalkylene polyols having a hydroxyl value of from 240 to 800, from 130 to 750, and from 145 to 350 mgKOH/g are prepared from alkanolamine, aliphatic polyhydroxy compound and the phenol resin represented by the formula (I), respectively, and then the polyoxyalkylene polyols thus obtained are mixed.

The foaming agents which are suitably used for the preparation of polyurethane foam in this invention are hydrochlorofluorocarbons (HCFC) such as 2,2-dichloro-1,1,1-trifluoroethane (HCFC-123) and 1,1-dichloro-1-fluoroethane (HCFC-141b). These hydrochlorofluorocarbons are preferred because of good compatibility with the polyoxyalkylene polyol mixture of this invention and causing much less environmental destruction. These hydrochlorofluorocarbons may be used in combination with other foaming agents including chlorofluorocarbons such as trichlorofluoromethane (CFC-11), low boiling point hydrocarbons and chlorinated hydrocarbons, and water.

Representative examples of the catalyst which is suitable for use in this invention includes amine compounds such as triethylamine, tripropylamine, triisopropylamine, triisopropanolamine, tributylamine, trioctylamine, hexadecylmethylamine N-methylmorpholine, N-ethylmorpholine, N-octadecylmorpholine, monoethanolamine, diethanolamine, triethanolamine, N-methyldiethanolamine, N,N-dimethylethanolamine, diethylenediamine, N,N,N',N'-tetramethylethylene-diamine, N,N,N',N',-tetramethylpropylenediamine N,N',N',-tetramethylbutane 1,4-diamine, N,N,N',N'-tetramethylbutane-1,3-butane diamine, N,N,N',N'-tetramethylhexamethylenediamine, bis [2-(N,N-dimethylamino)ethyl]ether, N,N-dimethylamine, N,N-dimethylcyclohexylamine, N,N,N',N'',N'''-pentamethyldiethylenetriamine and triethylenediamine; organic acid salts of triethylenediamine; alkylene oxide adducts of primary and secondary amines; aza ring containing compounds such as N,N-dialkylpiperazine; various N,N',N''-trialkylaminoalkylhexahydrotriazines; β-aminocarbonyl catalysts disclosed in Japanese Patent Publication SHO 52-43517(1977); β-aminonitrile catalysts disclosed in Japanese Patent Publication SHO 53-14279(1978); and organic metal compounds such as tin acetate, tin octoate, tin oleate, tin laurate, dibutyltin diacelate, dibutyltin dilaurate, dibutyltin dichloride, lead octoate, lead naphthenate, nickel naphthenate and cobalt naphthenate.

The catalyst is used singly or in combination. The amount of the catalyst is in the range of 0.0001 to 10.0 parts by weight per 100 parts by weight of the active hydrogen containing compound.

A cell regulator suitable for use in the invention is a dimethylsiloxane-polyoxyalkylene copolymer, that is, a conventionally known organosilicone base surface active agent. The cell regulator is for example, L-501, L-532, L-540, L-544, L-3550, L-5302, L-5305, L-5320, L-5340, L-5410, L-5420, L-5421, L-5710 and L-5720 from Nippon Unicar Co. Ltd.; SH-190, SH-192, SH-193, SH-194, SH-195, SH-200 and SPX-253 from Toray Silicone Co. Ltd.; F-114, F-121, F-122, F-220, F-230, F-258, F-260B, F-317, F-341 and F-345 from Shinetsu Silicone Co. Ltd.; and TFA-4200 and TFA-4202 from Toshiba Silicone Co. Ltd.

The cell regulator is used in an amount of 0.1 to 20 parts by weight per 100 parts by weight of the sum of active hydrogen containing compounds and organic polyisocyanate.

Exemplary flame retarding agents include tris(2-chloroethyl) phosphate, tris(dichloropropyl) phosphate, tris(dibromopropyl) phosphate, CR-505 and CR-507 from Daihachi Chemical Co. Ltd.

Phosgard® 2XC-20 and C-22-R from Monsanto Chem Co.,Ltd., and Fyrol® 6 from Stanfer Chemical Co. Ltd.

Other known additives such as plasticizers, fillers, stabilizers and colorants may be added when necessary.

[3] Preparation process of rigid polyurethane foam

The embodiments of this section are an applied aspect invention conducted in accordance with information above in sections [1] and [2].

Consequently, polyoxyalkylene polyol, organic polyisocyanate, and other additives which were mentioned in the foregoing sections can be applied as such.

The phenol resin used in the invention has, as mentioned in the preceding section, generally a number average molecular weight (Mn) of 650 to 1400 and a functionality (f) of 3 to 8.

Preferred phenol resin is novolak resin having (Mn) of 650 to 900, (f) of 3 to 8 and a softening point of 75° to 115° C.

Exemplary starting materials which can be used in combination with the phenol resin are the same as those described in the foregoing section.

Polyoxyalkylene polyol obtained by the addition of alkylene oxide to these starting materials has preferably a hydroxyl value in the range of 180 to 700 mgKOH/g.

An organic polyisocyanate which can be used is the same as used in the foregoing section.

A foaming agent, cell regulator, catalyst, flame retardant, plasticizer, filler, stabilizer, colorant and other necessary auxiliary agents are also the same as those described in the preceding section.

[4] Preparation process of rigid polyurethane foam composite

The invention described in this section is an applied aspect conducted in accordance with information set forth above in the section [1] to [3].

Consequently, polyoxyalkylene polyol, organic polyisocyanate, and other additives which were mentioned in the foregoing sections can be applied here.

Representative examples of top, bottom and side materials are plywoods, aluminum plates, steel plates corrugated boads, heavy-gage papers, laminated papers, clothes, and when necessary, flame retarded papers and clothes, and gypsum boads. The top, bottom and side material may be the same or different.

The foam composite of the invention can be prepared by a batch process, semicontinuous process and a continuous process.

In the continuous process, the processing machine is composed of top and bottom material feeding equipment, traversing head, double conveyor, heating tunnel, cutter and other necessary equipment.

A mixture of foaming ingredients are usually applied on the bottom material and top material is placed on the expanded foam prior to its curing.

The batch process can be carried out with relatively compact equipment and can also manufacture articles having irregular surfaces with relative ease.

Both in continuous and batch processes, the top and bottom materials must be fixed with a press on other equivalent equipment in order to withstand, pressure generated during foam expansion.

The rigid polyurethane foam of the invention can also be prepared in the interior of irregular shaped shells such as refrigerators and show cases.

In the practice of the invention, prescribed amounts of polyoxyalkylene polyol, catalyst, foaming agent, flame retardant and other additives are mixed to prepare a resin premix.

The resin premix thus obtained is rapidly mixed with an organic polyisocyanate in a prescribed ratio by using a polyurethane foaming machine having a mixing head.

The resulting mixture of rigid polyurethane foaming ingredients is then poured into the above mentioned continuous, semicontinuous or batch processing equipment to manufacture composites of the invention.

The flow ratio of the organic polyisocyanate to the resin premix is adjusted so that equivalent ratio of the isocyanate group to the active hydrogen atom in the premix is in the range of from 0.8 to 5.0.

The rigid polyurethane foam composites obtained by the process of the invention are useful for heat insulating materials or structural elements of building walls, ceiling boards, ware houses, refrigerators, ships and vehicles.

EXAMPLE

The present invention will hereinafter be illustrated further in detail by way of examples and comparative examples.

(1) Physical properties of polyurethane resins and foams obtained by using polyoxyalkylene polyols initiated from phenol base resin and alkanolamine. Physical properties of phenol resin, novolak resin and others used as raw materials in the present invention were illustrated in Table 1.

TABLE 1

Physical Properties of Novolak Resin and Phenol Base Resin

| No. | Grade (#) (Product of MITSUI TOATSU CHEMICALS, INC.) | Number average molecular weight (Mn) | Average functionality (f) | Softening point (°C.) |
|---|---|---|---|---|
| (1) | 1000 HS | 867 | 7.70 | 115 |
| (2) | 2000 | 723 | 6.37 | 95 |
| (3) | 9000 | 654 | 5.62 | 93 |
| (4) | Cresol/Novolak type | 815 | 6.71 | 103 |
| (5) | Bisphenol A/Nonylphenol type | 1032 | 5.18 | 121 |

Polyurethane resin was produced by reacting mixed polyoxyalkylene polyol and organic polyisocyanate in the weight ratio indicated in Table 2 to 4, and HCFC or CFC absorptivity of the above resin was measured.

On the other hand, the readiness of dispersing (workability) HCFC or CFC and the polyoxyalkylene polyol when the resin premix was prepared, and closed cell content the polyurethane foam obtained was determined.

Resin premix:
 Polyoxyalkylene polyol: 100 g
 Water: 0.5 g
 Silicon cell regulator: 1.5 g
  L-5420 (A product of Nippon Unicar Co. Ltd.)
 Catalyst: 1.0 g
  Kaolyzer No. 1 (A product of Kao Co. Ltd.)
 Cell regulator (HCHC, CFC): 40 g
  HCFC or CFC
Organic polyisocyanate:
 Crude diphenylmethane diisocyante
  (MD1-CR 200) (A product of Mitsui Toatsu Chemicals, Inc.) (mentioned in the table)

Foaming procedure:
Resin premix and organic polyisocyanate were vigorously mixed and immediately poured into a vertical box having dimensions of 200×200×200 mm, foamed and cured overnight at room temperature to obtain a rigid polyurethane foam.

EXAMPLE 1

To a 2 l autoclave, 500 g of novolak type phenol resin having (Mn) of 723, (f) of 6.37 and a softening point of 95° C. (Grade #2000, a product of Mitsui Toatsu Chemicals Inc.) was charged and fused at 120° C. after replacing the atomsphere with nitrogen. After adding 4 g of sodium hydroxide and 4 g of dimethylethanolamine, 821 g of propylene oxide was gradually charged. After 3 hours, propylene oxide in the system was removed and the residual reaction mixture was neutralized with acetic acid, filtered under reduced pressure to obtain 1303 g of polyoxyalkylene polyol (a-1) having a hydroxyl value of 198 mgKOH/g.

Similarly, 500 g of triethanolamine was charged to a 2 l autoclave, 821 g of propylene oxide was gradually fed at 120° C. and reacted for 3 hours. Unreacted propylene oxide was removed from the reaction mixture to obtain 1292 g of polyoxyalkylene polyol (b-1) having a hydroxyl value of 718 mgKOH/g. The numbers of alkylene oxide addition in the polyoxyalkylene polyols (a-1) and (b-1) were 3.1 and 0.5 moles, respectively, per mole of the hydroxyl in the starting materials.

Polyoxyalkylene polyols (a-1) and (b-1) were mixed in a ratio (a-1)/(b-1)=0.25 by weight to obtain a polyoxyalkylene polyol(A-1) having a hydroxyl value of 615 mgKOH/g and viscosity of 3600 cp/25° C. Results are illustrated in Table 2.

EXAMPLE 2

To a 2 l autoclave, 500 g of novolak type phenol resin having (Mn) of 723, (f) of 6.37 and a softening point of 95° C. (Grade #2000, a product of Mitsui Toatsu Chemicals Inc.) was charged and fused at 120° C. after replacing the atomsphere with nitrogen. After adding 2.3 g of dimethylethanolamine, 274 g of propylene oxide was gradually charged. After 3 hours, propylene oxide in the system was removed to obtain 730 g of polyoxyalkylene polyol (a-2) having a hydroxyl value of 339 mgKOH/g. The numbers of alkylene oxide addition in the polyoxyalkylene polyol (a-2) was 1.0 mole per mole of the phenolic hydroxyl.

Polyoxyalkylene polyol (a-2) was mixed with polyoxyalkylene polyol (b-1) obtained in Example 1 in a ratio (a-2)/(b-1)=1.0 by weight to obtain polyoxyalkylene polyol (A-2) having a hydroxyl value of 532 mgKOH/g and viscosity of 19,700 cp/25° C. Results are illustrated in Table 2.

EXAMPLE 3

The procedures of Example 1 were repeated by using 500 g of triethanolamine and 1752 g of propylene oxide to obtain polyoxyalkylene polyol (b-2) having a hydroxyl value of 253 mgKOH/g and propylene oxide addition number was 2.9 moles, per mole of a hydroxyl in the starting material.

The polyoxyalkylene polyol (a-2) obtained in Example 2 and (b-2) were mixed in a ratio (a-2)/(b-2)=2.0 by weight to obtain polyoxyalkylene polyol (A-3) having a hydroxyl value of 308 mgKOH/g and viscosity of 31,500 cp/25° C. Results are illustrated in Table 2.

EXAMPLE 4

To a 2 l autoclave, 500 g of novolak type phenol resin having (Mn) of 644, (f) of 5.62 and a softening point of 93° C. (Grade #9000, a product of Mitsui Toatsu Chemicals Inc.) was charged and fused at 120° C. after replacing the atomsphere with nitrogen. After adding 3.1 g of dimethylethanolamine, 547 g of propylene oxide was gradually charged. After 3 hours, propylene oxide in the system was removed and the residual reaction mixture was neutralized with acetic acid, filtered under reduced pressure to obtain 982 g of polyoxyalkylene polyol (a-3) having a hydroxyl value of 250 mgKOH/g.

Similarly, 500 g of triethanolamine was charged to a 2 l autoclave, 1348 g of propylene oxide was gradually fed at 120° C. and reacted for 3 hours. Unreacted propylene oxide was removed from the reaction mixture to obtain 1726 g of polyoxyalkylene polyol (b-3) having a hydroxyl value of 327 mgKOH/g. The numbers of alkylene oxide addition in the polyoxyalkylene polyols (a-3) and (b-3) were 1.9 and 2.1 moles, respectively, per mole of the hydroxyl in the starting material. Polyoxyalkylene polyols (a-3) and (b-3) were mixed in a ratio (a-3)/(b-3)=0.43 by weight to obtain a polyoxyalkylene polyol(A-4) having a hydroxyl value of 298 mgKOH/g and viscosity of 9670 cp/25° C. Results are illustrated in Table 2.

EXAMPLE 5

To a 2 l autoclave, 500 g of novolak type phenol resin having (Mn) of 723, (f) of 6.37 and a softening point of 95° C. (Grade#2000, a product of Mitsui Toatsu Chemicals Inc.) was charged and fused at 120° C. after replacing the atomsphere with nintrogen. After adding 4 g of dimethylethanolamine, 537 g of ethylene oxide was gradually charged. After 3 hours, ethylene oxide in the system was removed to obtain 1010 g of polyoxyalkylene polyol (a-4) having a hydroxyl value of 204 mgKOH/g.

Similarly, 500 g of triethanolamine was charged to a 2 l autoclave, 268 g of ethylene oxide was gradually fed at 120° C. and reacted for 3 hours. Unreacted ethylene oxide was removed from the reaction mixture to obtain polyoxyalkylene polyol (b-4) having a hydroxyl value of 661 mgKOH/g. The numbers of alkylene oxide addittion in the polyoxyalkylene polyols (a-4) and (b-4) were 2.8 and 0.6 moles, respectively, per mole of the hydroxyl in the starting material.

Polyoxyalkylene polyols (a-4) and (b-4) were mixed in a ratio (a-4)/(b-4)=1.0 by weight to obtain a polyoxyalkylene polyol(A-5) having a hydroxyl value of 465 mgKOH/g and viscosity of 13000 cp/25° C. Results are illustrated in Table 2.

EXAMPLE 6

Polyoxyalkylene polyols (a-1) and (b-1) obtained in Example 1 were mixed in a ratio (a-1)/(b-1)=4.0 by weight to obtain polyoxyalkylene polyol (A-6) having a hydroxyl value of 302 mgKOH/g and viscosity of 28000 cp/25° C. Results are illustrated in Table 2.

EXAMPLE 7 o-Cresol was reacted with an aqueous formaldehyde solution in the presence of p-toluenesulfonic acid as a catalyst to obtain novolak type cresol resin having (Mn) of 815, (f) of 6.71 and a softening point of 103° C.

The cresol resin thus obtained was used in place of phenol resin and the procedures of Example 2 were repeated under the conditions illustrated in Table 3 to obtain 781 g of polyoxyalkylene polyol (a-5) having a hydroxyl value of 295 mgKOH/g and a propylene oxide addition number of 1.2 moles.

Polyoxyalkylene polyol (a-5) was mixed with polyoxyalkylene polyol (b-1) obtained in Example 1 in a ratio (a-5)/(b-1)=1.0 to obtain polyoxyalkylene polyol (A-7) having a hydroxyl number of 507 mgKOH/g and viscosity of 19,700 cp/25° C. Results are illustrated in Table 3.

EXAMPLE 8

The procedures of Example 2 were repeated except 300 g of propylene oxide was used, and 774 g of polyoxyalkylene polyol (a-6) having a hydroxyl value of 320 mgKOH/g and a propylene oxide addition number of 1.1 moles was obtained.

The polyoxyalkylene polyol (a-6) was mixed with (b-2) obtained in Example 3 in a ratio (a-6)/(b-2)=2.0 by weight to obtain a polyoxyalkylene polyol (A-8) having a hydroxyl value of 295 mgKOH/g and viscosity of 31,500 cp/25° C. Results are illustrated in Table 3.

EXAMPLE 9

To a 2 l autoclave 500 g of novolak type phenol resin having (Mn) of 723, (f) of 637 and a softening point of 95° C. (Grade #2000, a product of Mitsui Toatsu Chemicals Inc.) and 280 g of triethanolamine were charged and fused at 120° C. after replacing the atomosphere with nitrogen. After adding 2.6 g of sodium hydroxide and 2.6 g of dimethylethanolamine, 1395 g of propylene oxide was gradually charged. After 3 hours, propylene oxide in the system was removed and the residual reaction mixture was neutralized with acetic acid, filtered under reduced pressure to obtain 2090 g of polyoxalkylene polyol (A-9) having a hydroxyl value of 291 mgKOH/g and viscosity of 26,400 cp/25° C.

Polyoxyalkylene polyol (A-9) had propylene oxide, addition numbers of 4.5 and 0.5 moles, respectively, per mole of phenolic hydroxyl and active hydrogen atom in the starting material.

EXAMPLE 10

A mixture composed of 1 part by weight of bisphenol A and 4 parts by weight of nonylphenol was reacted with an aqueous formaldehyde in the presence of p-toluene sulfonic acid. Bisphenol A/nonylphenol resin obtained had (Mn) of 1032, (f) of 5.18 and a softening point of 121° C.

The procedures of Example 9 was carried out by using 500 g of the above bisphenol A/nonylphenol resin, 2.3 g of dimethylethanolamine and 320 g of propylene oxide to give 744 g of polyoxyalkylene polyol (a-7) having a hydroxyl value of 182 mgKOH/g and a propylene oxide addition number of 1.9 moles.

The procedures of Example 1 were repeated by using 500 g of triethanolamine and 706 g of propylene oxide to obtain polyoxyalkylene polyol (b-5) having a hydroxyl number of 496 mgKOH/g and a propylene oxide addition number of 1.1 moles.

Polyoxyalkylene polyols (a-7) and (b-5) were mixed in a ratio (a-7)/(b-5)=0.67 by weight to obtain polyoxyalkylene polyol (A-10) having a hydroxyl value of 370 mgKOH/g and viscosity of 30,300 cp/25° C. Results are illustrated in Table 3.

EXAMPLE 11

Using 500 g of novolak type phenol resin having (Mn) of 867, (f) of 7.70 and a softening point of 115° C. (Grade:.#1000 HS, a product of Mitsui Toatsu Chemicals Inc.), 2.6 g of sodium hydroxide, 2.6 g of dimethylethanolamine and 1231 g of propylene oxide, 1640 g of polyoxyalkylene polyol (a-8) was prepared by repeating the procedures of Example 1. The polyoxyalkylene polyol (a-8) had a hydroxyl value of 153 mgKOH/g and a propylene oxide addition number of 4.4 moles.

Polyoxyalkylene polyol (a-8) was mixed with polyoxyalkylene polyol (b-2) obtained in Example 3 in a ratio (a-8)/(b-2)=1.5 by weight to obtain polyoxyalkylene polyol (A-11) having a hydroxyl value of 193 mgKOH/g and viscosity of 18,900/25° C. Results are illustrated in Table 3.

EXAMPLE 12

The procedures of Example 2 were repeated by using 305 g of propylene oxide to obtain 781 g of polyoxyalkylene polyol (a-9) having a hydroxyl value of 316 mgKOH/g and a propylene oxide addition number of 1.1 moles.

Polyoxyalkylene polyols (a-9) obtained above and (b-1) obtained in Example 1 were mixed in a ratio (a-9)/(b-1)=1 by weight to obtain polyoxyalkylene polyol (A-12) having a hydroxyl value of 517 mgKOH/g and viscosity of 19,700 cp/25° C. Results are illustrated in Table 4.

EXAMPLE 13

The procedures of Example 9 were repeated by using 307 g of the phenol resin used in Example 9, 583 g of triethanolamine, 4.5 g of sodium hydroxide and 886 g of propylene oxide to obtain 1470 g polyoxyalkylene polyol (A-13) having a hydroxyl value of 450 mgKOH/g, viscosity of 860 cp/25° C. and a propylene oxide addition number of 2.5 and 1.2 moles, respectivley, per mole of phenolic hydroxyl and active hydrogen atom.

COMPARATIVE EXAMPLE 1

Procedures of Example 2 were repeated except that 1277 g of propylene oxide and 5.3 g of dimethylethanolamine were used, and 1770 g of polyoxyalkylene polyol (a-10) was obtained. The polyoxyalkylene polyol (a-10) had a hydroxyl value of 139 mgKOH/g and a propylene oxide addition number of 5.0 moles.

Polyoxyalkylene polyols (a-10) obtained above and (b-2) obtained in Example 3 were mixed in a ratio (a-10)/(b-2)=1.0 by weight to obtain polyoxyalkylene polyol (A-14) having a hydroxyl value of 196 mgKOH/g and viscosity of 6300 cp/25° C. Results are illustrated in Table 4.

COMPARATIVE EXAMPLE 2

Procedures of Example 2 were repeated except that 127 g of propylene oxide and 1.9 g of dimethylethanolamine were used, and 627 g of polyoxyalkylene polyol (a-11) was obtained. Polyoxyalkylene polyol (a-11) had an hydroxyl value of 390 mgKOH/g and a propylene oxide addition number of 0.5 mole.

Polyoxyalkylene polyols (a-11) obtained above and (b-2 obtained in Example 3 were mixed in a ratio (a-11)/(b-2)=1.0 by weight to obtain polyoxyalkylene polyol (A-15) having a hydroxyl value of 320 mgKOH/g and viscosity of 22,000 cp/25° C. Results are illustrated in Table 4.

COMPARATIVE EXAMPLE 3

Polyoxyalkylene polyol having a hydroxyl value of 400 mgKOH/g and viscosity of 10,000 cp/25° C. (Grade #NC-400; a product of Mitsui Toatsu Chemicals Inc.) was used for the test as illustrated in Table 4.

COMPARATIVE EXAMPLE 4

Polyoxyalkylene polyol having a hydroxyl value of 470 mgKOH/g and viscosity of 13,000 cp/25° C. (Grade #NT-470; a product of Mitsui Toatsu Chemicals Inc.) was used for the test as illustrated in Table 4.

Polyoxyalkylene polyols obtained in Examples 1 to 13 and Comparative Examples 1 to 4 were subjected to foaming test and workability and foam properties were evaluated. Results are illustrated in Tables 2 to 4.

As clearly seen from these Tables, polyoxyalkylene polyols obtained by mixing polyoxyalkylene polyols of the invention which are initiated with phenol base resin and alkanolamine have good dispersibility in HCFC and hence exhibit good workability. The polyurethane resins prepared by using the polyoxyalkylene polyols of the invention have good resistance to dissolving in HCFC and also the rigid polyurethane foams prepared by using HCFC have equivalent properties to conventional rigid polyurethane foams obtained by using CFC.

TABLE 2

| | Example | | | | | |
|---|---|---|---|---|---|---|
| | 1 | 2 | 3 | 4 | 5 | 6 |
| Mixed polyoxyalkylene polyol (mark) | A-1 | A-2 | A-3 | A-4 | A-5 | A-6 |
| Polyoxyalkylene polyol (a) | | | | | | |
| Phenol base resin (g) | 500 | 500 | 500 | 500 | 500 | 500 |
| (No.: Table 1) | (2) | (2) | (2) | (3) | (2) | (2) |
| Alkylene oxide (g) | | | | | | |
| Propylene oxide | 821 | 274 | 274 | 547 | | 821 |
| Ethylene oxide | | | | | 537 | |
| Alkylene oxide addition amount (mol/OH mol) | 3.1 | 1.0 | 1.0 | 1.9 | 2.8 | 3.1 |
| OH-value (mg KOH/g) | 198 | 339 | 339 | 250 | 204 | 198 |
| Polyoxyalkylene polyol (b) | | | | | | |
| Triethanolamine (g) | 500 | 500 | 500 | 500 | 500 | 500 |
| Alkylene oxide (g) | | | | | | |
| Propylene oxide | 821 | 821 | 1752 | 1348 | | 821 |
| Ethylene oxide | | | | | 268 | |
| Alkylene oxide addition amount (mol/OH mol) | 0.5 | 0.5 | 2.9 | 2.1 | 0.6 | 0.5 |
| OH-value (mg KOH/g) | 718 | 718 | 253 | 327 | 661 | 718 |
| Mixed polyoxyalkylene polyol (a) + (b) | | | | | | |
| Mixing ratio, (a)/(b) (weight) | 0.25 | 1.0 | 2.0 | 0.43 | 1.0 | 4.0 |
| OH-value (mg KOH/g) | 615 | 532 | 308 | 298 | 465 | 302 |
| Viscosity (cp/25° C.) | 3600 | 19700 | 31500 | 9670 | 13000 | 28000 |
| Mixed polyoxyalkylene polyol Organic polyisocyanate (Weight ratio) | 10/15 | 12/17 | 12/10 | 14/10 | 12/15 | 12/10 |
| Workability | | | | | | |
| CFC-11 | good | good | good | good | good | good |
| HCFC-123 | good | good | good | good | good | good |
| Closed cell content (%) | | | | | | |
| CFC-11 | 89.7 | 87.9 | 88.6 | 86.3 | 86.7 | 89.7 |
| HCFC-123 | 87.8 | 86.7 | 85.9 | 85.6 | 85.3 | 87.8 |
| HCFC-141b | 88.2 | 87.1 | 87.0 | 85.9 | 86.0 | 88.2 |
| Furon absorption factor | | | | | | |
| HCFC-123 (g) | | | | | | |
| after 0 hour | 16.66 | 29.16 | 21.99 | 20.32 | 27.02 | 21.80 |
| after 28 hour | 16.69 | 29.18 | 22.01 | 20.34 | 27.02 | 21.82 |
| absorption (%) | 0.2 | 0.1 | 0.1 | 0.1 | 0.0 | 0.1 |
| HCFC-141b (g) | | | | | | |
| after 0 hours | 16.67 | 29.16 | 21.99 | 20.32 | 27.02 | 21.80 |
| after 28 hours | 16.69 | 29.18 | 21.99 | 20.32 | 27.02 | 21.82 |

TABLE 2-continued

|  | Example |  |  |  |  |  |
|---|---|---|---|---|---|---|
|  | 1 | 2 | 3 | 4 | 5 | 6 |
| Mixed polyoxyalkylene polyol (mark) | A-1 | A-2 | A-3 | A-4 | A-5 | A-6 |
| absorption (%) | 0.1 | 0.1 | 0.0 | 0.0 | 0.0 | 0.1 |

(Note)
OH-value: Hydroxyl value (JIS K1557)
Viscosity: JIS K 1557
(hereinafter the same)
Workability: Dispersing ability of furan in mixed polyoxyalkylene polyol
Closed cell content: Beckmann air comparison hydrometer (TOSHIBA), (ASTM D-2856)
Furon absorption factor: Weight increase rate of a specimen of polyurethane resin (non-use of furon) having dimensions of 40 × 40 × 7~17 mm after immersion in 50 g of furon.

TABLE 3

|  | Example |  |  |  |  |
|---|---|---|---|---|---|
|  | 7 | 8 | 9 | 10 | 11 |
| Mixed polyoxyalkylene polyol (mark) | A-7 | A-8 | A-9 | A-10 | A-11 |
| Polyoxyalkylene polyol (a) | | | | | |
| Phenol base resin (g) | 500 | 500 | 500 | 500 | 500 |
| (No.: Table 1) | (4) | (2) | (2) | (5) | (1) |
| Alkylene oxide (g) | 305 | 300 | 1395* | 320 | 1231 |
| Propylene oxide | | | | | |
| Alkylene oxide addition amount (mol/OH mol) | 1.2 | 1.1 | 4.5 | 1.9 | 4.4 |
| OH-value (mg KOH/g) | 295 | 320 |  | 182 | 153 |
| Polyoxyalkylene polyol (b) | | | | | |
| Triethanolamine (g) | 500 | 500 | 280 | 500 | 500 |
| Alkylene oxide (g) | 821 | 1752 |  | 706 | 1752 |
| Propylene oxide | | | | | |
| Alkylene oxide addition amount (mol/OH mol) | 0.5 | 2.9 | 0.5 | 1.1 | 2.9 |
| OH-value (mg KOH/g) | 718 | 253 |  | 496 | 253 |
| Mixed polyoxyalkylene polyol (a) + (b) | | | | | |
| Mixing ratio, (a)/(b) (weight) | 1.0 | 2.0 |  | 0.67 | 1.5 |
| OH-value (mg KOH/g) | 507 | 295 | 291 | 370 | 193 |
| Viscosity (cp/25° C.) | 19700 | 31500 | 26400 | 30300 | 18900 |
| Mixed polyoxyalkylene polyol / Organic polyisocyanate (Weight ratio) | 10/12 | 12/9 | 10/7 | 10/9 | 20/10 |
| Workability | | | | | |
| CFC-11 | good | good | good | good | good |
| HCFC-123 | good | good | good | good | good |
| Closed cell content (%) | | | | | |
| CFC-11 | 87.9 | 88.9 | 87.6 | 89.2 | 89.5 |
| HCFC-123 | 86.8 | 86.8 | 86.5 | 88.6 | 88.2 |
| HCFC-141b | 86.9 | 87.0 | 87.6 | 88.9 | 88.6 |
| Furon absorption factor | | | | | |
| HCFC-123 (g) | | | | | |
| after 0 hour | 21.87 | 20.58 | 17.77 | 22.23 | 15.63 |
| after 28 hour | 21.87 | 20.58 | 17.79 | 22.23 | 15.65 |
| absorption (%) | 0.1 | 0.0 | 0.1 | 0.0 | 0.1 |
| HCFC-141b (g) | | | | | |
| after 0 hours | 21.87 | 20.58 | 17.77 | 22.23 | 15.63 |
| after 28 hours | 21.87 | 20.58 | 17.77 | 22.23 | 15.65 |
| absorption (%) | 0.0 | 0.0 | 0.0 | 0.0 | 0.1 |

(Note) Amount based on the mixture of phenol base resin (2) and triethanolamine

TABLE 4

|  | Example | | Comparative example | | | |
|---|---|---|---|---|---|---|
|  | 12 | 13 | 1 | 2 | 3 | 4 |
| Mixed polyoxyalkylene polyol (mark) | A-12 | A-13 | A-14 | A-15 | NC-400** | NT-470 |
| Polyoxyalkylene polyol (a) | | | | | | |
| Phenol base resin (g) | 500 | 307 | 500 | 500 | | |
| (No.: Table 1) | (2) | (2) | (2) | (2) | | |
| Alkylene oxide (g) | 305 | 886* | 1277 | 127 | | |
| Propylene oxide | | | | | | |
| Alkylene oxide addition amount (mol/OH mol) | 1.1 | 2.5 | 5.0 | 0.5 | 1.6 | 1.4 |
| OH-value (mg KOH/g) | 316 |  | 139 | 390 | | |
| Polyoxyalkylene polyol (b) | | | | | | |
| Triethanolamine (g) | 500 | 583 | 500 | 500 | | |
| Alkylene oxide (g) | 821 |  | 1752 | 1752 | | |
| Propylene oxide | | | | | | |
| Alkylene oxide addition amount (mol/OH mol) | 0.5 | 1.2 | 2.9 | 2.9 | | |
| OH-value (mg KOH/g) | 718 |  | 253 | 253 | | |
| Mixed polyoxyalkylene polyol (a) + (b) | | | | | | |
| Mixing ratio, (a)/(b) (weight) | 1.0 |  | 1.0 | 1.0 | | |
| OH-value (mg KOH/g) | 517 | 450 | 195 | 320 | 400 | 470 |

TABLE 4-continued

| | Example | | Comparative example | | | |
|---|---|---|---|---|---|---|
| Mixed polyoxyalkylene polyol (mark) | 12<br>A-12 | 13<br>A-13 | 1<br>A-14 | 2<br>A-15 | 3<br>NC-400** | 4<br>NT-470 |
| Viscosity (cp/25° C.) | 19700 | 860 | 6300 | 22000 | 10000 | 13000 |
| Mixed polyoxyalkylene polyol<br>Organic polyisocyanate (Weight ratio) | 10/8 | 12/14 | 12/6 | | 10/10 | 13/15 |
| Workability | | | | | | |
| CFC-11 | good | good | good | | good | good |
| HCFC-123 | good | good | good | | good | good |
| Closed cell content (%) | | | | | | |
| CFC-11 | 88.0 | 86.3 | 85.5 | no | 87.5 | 86.9 |
| HCFC-123 | 86.9 | 85.0 | 78.2 | foamable | 80.5 | 78.3 |
| HCFC-141b | 87.3 | 85.5 | 79.5 | | 80.7 | 80.5 |
| Furon absorption factor | | | | | | |
| HCFC-123 (g) | | | | | | |
| after 0 hour | 22.84 | 26.54 | 18.40 | | 24.94 | 27.18 |
| after 28 hour | 22.84 | 26.54 | 22.50 | | 31.27 | 29.10 |
| absorption (%) | 0.0 | 0.0 | 22.3 | | 25.4 | 7.1 |
| HCFC-141b (g) | | | | | | |
| after 0 hours | 22.84 | 26.54 | 18.40 | | 24.94 | 27.18 |
| after 28 hours | 22.84 | 26.54 | 21.50 | | 30.31 | 28.97 |
| absorption (%) | 0.0 | 0.0 | 14.1 | | 21.5 | 6.6 |

(Note)
*Amount based on the mixture of phenol base resin (2) and triethanolamine
**Product of MITSUI TOATSU CHEMICALS. INC. Sucrose/Amine base polyol (2) Physical properties of polyurethane resin and foam obtained by using polyoxyalkylene polyols initiated from phenol base resin and aliphatic polyhydroxy compounds.

Physical properties of phenol resin, novolak resin and others used as raw materials in this chapter are same as that in Table 1.

The description of polyurethane resin, HCFC or CFC absorptivity, readiness of dispersing (workability), closed cell content of foam, resin premix, organic polyisocyanate and foaming are same as that in afore-mentioned chapter (1).

EXAMPLE 14

Procedures of Example 1 were repeated except that 500 g of glycerol, 3 g of potassim hydroxide and 832 g of propylene oxide, and 1251 g of polyoxyalkylene polyol (b-1) was obtained. Polyoxyalkylene polyol (b-1) had a hydroxyl value of 730 mgKOH/g and a propylene oxide addition number of 0.8 mole.

Polyoxyalkylene polyols (a-1) obtained in Example 1 and (b-1) obtained above were mixed in a ratio (a-1)/(b-1)=1.0 by weight to obtain polyoxyalkylene polyol (B-1) having a hydroxyl value of 460 mgKOH/g and viscosity of 6300 cp/25° C. Results are illustrated in Table 5.

EXAMPLE 1

Polyoxyalkylene polyols (a-5) obtained in Example 7 and (b-1) obtained in Example 14 were mixed in a ratio (a-5)/(b-1)=4 by weight to obtain polyoxyalkylene polyol (B-2) having a hydroxyl value of 390 mgKOH/g and viscosity of 12,700 cp/25° C. Results are illustrated in Table 5.

EXAMPLE 16

Procedures of Example 1 were repeated excep that 500 g of trimethylolpropane, 2 g of sodium hydroxide, 5 l autoclave and 4230 g of propylene oxide were used and 4528 g of polyoxyalkylene polyol (b-2) was obtained. Polyoxyalkylene polyol (b-2) had a hydroxyl value of 141 mgKOH/g and a propylene oxide addition number of 6.2 moles.

Polyoxyalkylene polyols (a-6) obtained in Example 8 and (b-2) obtained above were mixed in a ratio (a-6)/(b-2)=1.5 by weight to obtain polyoxyalkylene polyol (B-3) having a hydroxyl value of 245 mgKOH/g and viscosity of 4900 cp/25° C. Results are illustrated in Table 5.

EXAMPLE 17

Procedures of Example 1 were 5.2 g of sodium hydroxide and repeated except that 250 g of the novolak type phenol resin of Example 1, 500 g of glycerol, 5.2 g of dimethylethanolamine and 5.2 g of sodium hydroxide were used and 1965 g of propylene oxide was added.

Polyoxyalkylene polyol (B-4) thus obtained was 1790 g and had a hydroxyl value of 195 mgKOH/g, viscosity of 5300 cp/25° C. and a propylene oxide addition numbers of 4.5 and 1.2 moles per mole of hydroxyl group in the phenol resin and glycerol, respectively. Results are illustrated in Table 5.

EXAMPLE 18

Procedures of Example 1 were repeated except that 110 g of glycerol, 390 g of sucrose, 2 g of sodium hydroxide, 2420 g of propylene oxide and phospholic acid for neutralization were used. Polyoxyalkylene polyol (b-3) thus obtained was 2813 g and had a hydroxyl value of 251 mgKOH/g and a propylene oxide addition number of 3.1 moles.

Polyoxyalkylene polyols (a-7) obtained in Example 10 and (b-3) obtained above were mixed in a ratio (a-7)/(b-3)=0.33 by weight to obtain polyoxyalkylene polyol (s-5) having a hydroxyl value of 235 mgKOH/g and viscosity of 2800 cp/25° C. Results are illustrated in Table 5.

EXAMPLE 19

To a 5 l autoclave, 500 g of glycerol and 3 g of potassium hydroxide were charged and 2383 g of propylene oxide was gradually added at 120° C. and reacted for 3 hours. Unreacted propylene oxide was removed from the reaction mixture. The residue was neutralized with phosphoric acid, filtered and dried to obtain 2760 g of polyoxyalkylene polyol (b-4) having a hydroxyl value of 327 mgKOH/g and a propylene oxide addition number of 2.4 mole.

To the same autoclave, 500 g of novolak type phenol resin having (Mn) of 867, (f) of 7.70 and a softening point of 115° C. (Grade #1000 HS, a product of Mitsui Toatsu Chemicals Inc.) was charged and fused at 120° C. after replacing the atomsphere with nitrogen. After adding 5.2 g of sodium hydroxide and 5.2 g of dimethylethanolamine, 760 g propylene oxide was gradually charged. After 3 hours, propylene oxide in the system was removed and the residual reaction mixture was neutralized with acetic acid, filtered under reduced pressure to obtain 3980 g of polyoxyalkylene polyol (B-6) having a hydroxyl value of 267 mgKOH/g, viscosity of 3100 cp/25° C. and a propylene oxide addition number of 2.8 mole. Results are illustrated in Table 5.

hydroxyl value of 240 mgKOH/g and viscosity of 9750 cp/25° C. Results are illustrated in Table 5.

Polyoxyalkylene polyols obtained in Examples 14 to 20 were subjected to foaming test and workability and foam properties were evaluated. Result are illustrated in Table 5.

As clearly seen from Table 5, polyoxyalkylene polyols obtained by mixing polyoxyalkylene polyols of the invention which are initiated with phenol base resin and an aliphatic polyhydroxy compound have good dispersibility in HCFC and hence exhibit good workability. The polyurethane resins prepared by using polyoxyalkylene polyols of the invention have good resistnace to dissolving in HCFC and also the rigid polyurethane foams prepared by using HCFC have equivalent properties to conventional regid polyurethane foams obtained by using CFC.

TABLE 5

| | Example | | | | | | |
|---|---|---|---|---|---|---|---|
| | 14 | 15 | 16 | 17 | 18 | 19 | 20 |
| Mixed polyoxyalkylene polyol (mark) | B-1 | B-2 | B-3 | B-4 | B-5 | B-6 | B-7 |
| Polyoxyalkylene polyol (a) | | | | | | | |
| Phenol base resin (g) | 500 | 500 | 500 | 250 | 500 | 500 | 500 |
| (No.: Table 1) | (2) | (4) | (2) | (2) | (5) | (1) | (3) |
| Alkylene oxide (g) | 821 | 305 | 300 | 1965* | 320 | 760 | 547 |
| Propylene oxide | | | | | | | |
| Alkylene oxide addition amount (mol/OH mol) | 3.1 | 1.2 | 1.1 | 4.5 | 1.9 | | 1.9 |
| OH-value (mg KOH/g) | 198 | 295 | 320 | | 182 | | 250 |
| Polyoxyalkylene polyol (b) | | | | | | | |
| Glycerin (g) | 500 | 500 | | 500 | 110 | 500 | 250 |
| Trimethyrolpropane (g) | | | 500 | | | | |
| Sucrose (g) | | | | | 390 | | 250 |
| Alkylene oxide (g) | 832 | 832 | 4230 | | 2420 | 2383 | 3530 |
| Propylene oxide | | | | | | | |
| Alkylene oxide addition amount (mol/OH mol) | 0.8 | 0.8 | 6.2 | 1.2 | 3.1 | 2.4 | 4.1 |
| OH-value (mg KOH/g) | 730 | 730 | 141 | | 251 | 327 | 207 |
| Mixed polyoxyalkylene polyol (a) + (b) | | | | | | | |
| Mixing ratio, (a)/(b) (weight) | 1.0 | 4.0 | 1.5 | | 0.33 | 2.8 | 3.0 |
| OH-value (mg KOH/g) | 460 | 390 | 245 | 195 | 235 | 267 | 240 |
| Viscosity (cp/25° C.) | 6300 | 12700 | 4900 | 5300 | 2800 | 3100 | 9750 |
| Mixed polyoxyalkylene polyol Organic polyisocyanate (Weight ratio) | 10/12 | 10/10 | 10/6 | 10/5 | 17/10 | 20/13 | 15/9 |
| Workability | | | | | | | |
| CFC-11 | good | good | good | good | good | good | good |
| | good | good | good | good | good | good | good |
| HCFC-123 | good | good | good | good | good | good | good |
| Closed cell content (%) | | | | | | | |
| CFC-11 | 89.1 | 87.9 | 88.4 | 87.2 | 88.6 | 87.2 | 87.5 |
| HCFC-123 | 87.9 | 86.5 | 86.9 | 86.8 | 88.4 | 86.9 | 85.9 |
| HCFC-141b | 87.6 | 86.9 | 87.4 | 87.6 | 88.9 | 87.3 | 87.0 |
| Furon absorption factor | | | | | | | |
| HCFC-123 (g) | | | | | | | |
| after 0 hour | 17.55 | 19.87 | 15.58 | 14.77 | 13.23 | 30.35 | 18.38 |
| after 28 hour | 17.59 | 19.87 | 15.61 | 14.78 | 13.27 | 30.41 | 18.38 |
| absorption (%) | 0.2 | 0.0 | 0.2 | 0.1 | 0.3 | 0.2 | 0.0 |
| HCFC-141b (g) | | | | | | | |
| after 0 hours | 17.55 | 19.87 | 15.58 | 14.77 | 13.23 | 30.35 | 18.38 |
| after 28 hours | 17.57 | 19.87 | 15.60 | 14.77 | 13.26 | 30.38 | 18.38 |
| absorption (%) | 0.1 | 0.0 | 0.1 | 0.0 | 0.2 | 0.1 | 0.0 |

(Note)
*Amount based on the mixture of phenol base resin (2) and glycerin
The same as Note in Table 2

EXAMPLE 20

Procedures of Example 19 were repeated except that 250 g of glycerol, 250 g of sucrose, 3 g of sodium hydroxide and 3530 g of propylene oxide was used. Polyoxyalkylene polyol (b-5) thus obtained was 3860 g and had a hydroxyl value of 207 mgKOH/g and a propylene oxide addition number of 4.1 moles.

Polyoxyalkylene polyols (a-3) obtained in Example 4 and (b-5) obtained above were mixed in a ratio (a-3)/(b-5)=3 to obtain polyoxyalkylene polyol (B-7) having a (3) Preparation of rigitd polyurethane foams Starting materials, kind and amount of alkylene oxide added, and hydroxyl value of polyoxyalkylene polyol used for the preparation of rigid polyurethane foams are illustrated in Table 6 and 7.

EXAMPLES 21-27 AND COMPARATIVE EXAMPLES 5-9

Polyoxyalkylene polyols from C-1 to C-10 which are illustrated in Tables 6 and 7 were used as raw materials.

With each 100 g of these polyols, a foaming agent, cell regulator and a catalyst were mixed in accordance with the formulations illustrated in Tables 8 and 9, respectively. To the resin premix thus obtained, organic polyisocyanate (MDI-CR) was added in an amount illustrated in Tables 8 and 9.

The resulting mixture was rapidly stirred for 8 seconds at a rate of 5,000 rpm and immediately poured into a vertical box having internal dimensions of 200×200×200 mm and a vertical box having internal dimensions of 380×380×35 mm. The mixture was free foamed and thereafter allowed to stand for a day at room temperature.

Specimens having dimensions of 80×80×30 mm were cut from the foam of 200×200×200 mm in size and compressive strength was measured in accordance with JIS A-9514. A specimen having dimensions of 200×200×25 mm were cut from the foam of 380×380×35 mm in size and thermal conductivity was measured in accordance with JIS A-1412.

The reactivity of polyoxyalkylene polyol was evaluated by adjusting the temperature of resin premix and organic polyisocyanate (MDI-CR) at 20° C. in advance, carrying out free foaming under the same conditions as above, and measuring cream time, gel time and tack free time in seconds in due order. Results are illustrated in Table 8 and Table 9.

As seen in Tables 8 and 9, when hydrochlorofluorocarbon (HCFC) foaming agents were used in place of chlorofluorocarbon (CFC) foaming agent, the conventional formulations lead to decrease in reactivity and deterioration of resulting foam properties. On the other hand, polyoxyalkylene polyols of the present invention could provide rigid polyurethane foams having excellent properies, even though hydrochlorofluorocarbons were used as foaming agents.

TABLE 6

| Mixed polyoxyalkylene polyol (mark) | Polyoxyalkylene polyol used in Example | | | | | |
|---|---|---|---|---|---|---|
| | C-1 | C-2 | C-3 | C-4 | C-5 | C-6 |
| Starting material (g) Novolak resin (No.: Table 1) (2) | 50 | 50 | 50 | 25 | 10 | 70 |
| Diethanolamine | 50 | | | | | |
| Triethanolamine | | 50 | 50 | 75 | 90 | 30 |
| Alkylene oxide (% by weight) | | | | | | |
| Propylene oxide | 100 | 100 | 50 | 100 | 100 | 100 |
| Ethylene oxide | | | 50 | | | |
| Polyoxyalkylene polyol OH-value (mg KOH/g) | 450 | 350 | 450 | 700 | 450 | 350 |

(Note)
For example: "Propylene oxide 100" means propylene oxide alone. "Propylene oxide 50, ethylene oxide 50" means a mixture of 50% by weight of propylene oxide and 50% by weight of ethylene oxide.

TABLE 7

| Mixed polyoxyalkylene polyol (mark) | Polyoxyalkylene polyol used in comparative example | | | |
|---|---|---|---|---|
| | C-7 | C-8 | C-9 | C-10 |
| Starting material (g) | | | | |
| Sucrose | 70 | 60 | | |
| Glycelin | | 40 | | |
| Triethanolamine | 30 | | 50 | 100 |
| Tolylenediamine | | | 50 | |
| Alkylene oxide (% by weight) | 100 | 100 | 100 | 100 |
| Propylene oxide | | | | |
| Polyoxyalkylene polyol OH-value (mg KOH/g) | 450 | 450 | 450 | 450 |

(NOTE) Alkylene oxide (% by weigh): same as note in Table 6.

TABLE 8

| | Example | | | | | | |
|---|---|---|---|---|---|---|---|
| | 21 | 22 | 23 | 24 | 25 | 26 | 27 |
| MDI-CR (g) | 120 | 95 | 120 | 120 | 144 | 120 | 126 |
| Polyoxyalkylene polyol (100 g) | C-1 | C-2 | C-3 | C-4 | C-1 | C-5 | C-6 |
| H₂O (g) | — | — | — | — | 1.5 | 1.5 | 1.5 |
| L-5421 (g) | 1.5 | 1.5 | 1.5 | 1.5 | 1.5 | 1.5 | 1.5 |
| TMHDA (g) | 0.7 | 2.0 | 0.1 | 0.5 | 0.5 | 0.3 | 0.5 |
| [CFC-11] (g) | 33 | 29 | 33 | 33 | 37 | 33 | 23 |
| Reactivity (sec) | 18/49/55 | 17/48/62 | 12/35/48 | 19/46/54 | 18/50/63 | 17/52/58 | 18/53/60 |
| Compressive strength (kg/cm²) | 3.7 | 3.5 | 3.05 | 3.5 | 3.9 | 3.8 | 3.9 |
| Heat conductivity (Kcal/mhr °C.) | 0.0140 | 0.0140 | 0.0139 | 0.0145 | 0.0160 | 0.0160 | 0.0163 |
| [HCFC-123] (g) | 38 | 32 | 36 | 36 | 40 | 36 | 25 |
| Reactivity (sec) | 19/50/53 | 20/55/67 | 15/41/54 | 21/45/55 | 19/51/63 | 17/53/59 | 19/55/62 |
| Compressive strength (kg/cm²) | 3.0 | 2.8 | 3.1 | 3.2 | 3.8 | 3.7 | 3.8 |
| Heat conductivity (Kcal/mhr °C.) | 0.0150 | 0.0153 | 0.0145 | 0.0151 | 0.0168 | 0.0165 | 0.0166 |
| [HCFC-141b] | 30 | 24 | 30 | 29 | 33 | 29 | 20 |
| Reactivity (sec) | 19/50/57 | 18/48/56 | 14/33/42 | 19/45/54 | 19/53/63 | 20/55/65 | 19/55/60 |
| Compressive strength (kg/cm²) | 3.3 | 2.9 | 3.25 | 3.3 | 3.8 | 3.5 | 3.4 |
| Heat conductivity (Kcal/mhr °C.) | 0.0152 | 0.0150 | 0.0146 | 0.0153 | 0.0165 | 0.0167 | 0.0165 |

(Note)
1. Foaming agent is used alone in an amount (g) indicated in Table 8. Foaming agent is used in an amount to obtained a foam density of 40 kg/m³
2. Compressive strength: JIS A-9514
3. Heat conductivity: JIS A-1412
4. TMHDA: Tetramethylhexamethylenediamine (catalyst)
5. Reactivety: creaming time/gelatinizing time/tack-free time

TABLE 9

| | Comparative Example | | | | |
|---|---|---|---|---|---|
| | 5 | 6 | 7 | 8 | 9 |
| MDI-CR (g) | 120 | 120 | 120 | 120 | 144 |
| Polyoxyalkylene polyol (100 g) | C-7 | C-8 | C-9 | C-10 | C-8 |
| $H_2O$ (g) | — | — | — | — | 1.5 |
| L-5421 (g) | 1.5 | 1.5 | 1.5 | 1.5 | 1.5 |
| TMHDA (g) | 4.5 | 6.0 | 1.5 | 1.3 | 5.5 |
| [CFC-11] (g) | 33 | 33 | 32 | 33 | 31 |
| Reactivity (sec) | 19/43/58 | 21/46/55 | 18/49/62 | 18/47/55 | 18/49/62 |
| Compressive strength (kg/cm$^2$) | 3.5 | 3.7 | 2.6 | 2.3 | 3.8 |
| Heat conductivity (Kcal/mhr °C.) | 0.0148 | 0.0150 | 0.0149 | 0.0154 | 0.0175 |
| [HCFC-123] (g) | 38 | 38 | 38 | 38 | 34 |
| Reactivity (sec) | 30/50/62 | 31/51/65 | 24/52/65 | 26/51/60 | 22/52/63 |
| Compressive strength (kg/cm$^2$) | 2.5 | 2.3 | 2.0 | 1.9 | 2.3 |
| Heat conductivity (Kcal/mhr °C.) | 0.0163 | 0.0166 | 0.0166 | 0.0171 | 0.0184 |
| [HCFC-141b] | 30 | 30 | 30 | 30 | 27 |
| Reactivity (sec) | 23/46/54 | 25/47/57 | 22/51/63 | 26/51/62 | 20/50/62 |
| Compressive strength (kg/cm$^2$) | 2.7 | 2.5 | 2.1 | 1.7 | 2.5 |
| Heat conductivity (Kcal/mhr °C.) | 0.0165 | 0.0169 | 0.0166 | 0.0170 | 0.0185 |

(Note) same as Table 8.

(4) Preparation of rigid polyurethane foam composite boards having face material (A) Polyurethane foam composite board having one face material Starting material, kind and amount of alkylene oxide added, and hydroxyl value of polyoxyalkylene polyol used for the preparation of the composite boards are illustrated in Tables 10 and 11.

Examples 28–43 and comparative Examples 10–19

Polyoxyalkylene polyols from D-1 to D-14, and B-4, A-6, and C-4 which are illustrated in Table 10 and Table 11 were used as raw materials.

Physical properties of the foam portion in the composite board of the invention and the reactivity of polyoxyalkylene polyols of the invention were evaluated by carrying out the same procedures as conducted in Examples 21–27. Results are illustrated in Table 12.

TABLE 10

| | Polyoxyalkylene polyol used in Example | | | | | | | | | | |
|---|---|---|---|---|---|---|---|---|---|---|---|
| Mixed polyoxyalkylene polyol (mark) | D-1 | D-2 | D-3 | D-4 | D-5 | D-6 | D-7 | D-8 | B-4 | A-6 | C-4 |
| Starting material (g) | | | | | | | | | | | |
| Novolak resin (No.: Table 1) (2) | 50 | 50 | 25 | 70 | 50 | 50 | 70 | 30 | 30 | 50 | 25 |
| Glycerin | 50 | | | | | | | | 70 | | |
| Diethanolamine | | | | | 50 | | 30 | | | | |
| Triethanolamine | | 50 | 75 | 30 | | 50 | | 70 | | 50 | 75 |
| Alkylene oxide (% by weight) | | | | | | | | | | | |
| Propylene oxide | 50 | 100 | 100 | 100 | 100 | 100 | 50 | 50 | 100 | 100 | 100 |
| Ethylene oxide | 50 | | | | | | 50 | 50 | | | |
| OH-value of Polyoxyalkylene polyol (mg KOH/g) | 500 | 600 | 450 | 400 | 450 | 500 | 500 | 450 | 195 | 302 | 700 |

(Note) Alkylene oxide (% by weight): same as note in Table 6.

TABLE 11

| | Polyoxyalkylene polyol used in comparative example | | | | | |
|---|---|---|---|---|---|---|
| Mixed polyoxyalkylene polyol (mark) | D-9 | D-10 | D-11 | D-12 | D-13 | D-14 |
| Starting material (g) | | | | | | |
| Sucrose | 60 | | | 80 | | |
| Glycelin | 40 | | | | | |
| Triethanolamine | | | | | 30 | 30 |
| Ethylenediamine | | 100 | 100 | 20 | | |
| Tolylenediamine | | | | | 70 | 70 |
| Alkylen oxide (% by weight) | | | | | | |
| Propylene oxide | 100 | 100 | 50 | 100 | 100 | 50 |
| Ethylene oxide | | | 50 | | | 50 |
| OH-value of Polyoxyalkylene polyol (mg KOH/g) | 450 | 750 | 450 | 500 | 400 | 400 |

(Note) D-10 and D-11 are also used in examples (refer to Table 12) Alkylene oxide (% by weight): the same as Note in Table 6.

TABLE 12

| | Example | | | | | | Comparative example | | |
|---|---|---|---|---|---|---|---|---|---|
| | 28 | 29 | 30 | 31 | 32 | 33 | 10 | 11 | 12 |
| Formulation (g) | | | | | | | | | |
| MDI-CR | 168 | 168 | 168 | 168 | 168 | 170 | 174 | 176 | 174 |
| Polyoxyalkylene polyol | | | | | | | | | |

TABLE 12-continued

|  | Example | | | | | | Comparative example | | |
| --- | --- | --- | --- | --- | --- | --- | --- | --- | --- |
|  | 28 | 29 | 30 | 31 | 32 | 33 | 10 | 11 | 12 |
| D-1 | 60 | | | | | | | | |
| D-2 | | 100 | | | 20 | 40 | | | |
| D-3 | | | 50 | | | | | | |
| D-4 | | | | 50 | | | | | |
| D-5 | | | | | 40 | | | | |
| D-9 | | | | | | | 10 | | 10 |
| D-10 | 40 | | 50 | 50 | 40 | 35 | 55 | 60 | 55 |
| D-11 | | | | | | 25 | 35 | 40 | 35 |
| TCEP | 10 | 10 | 10 | 10 | 10 | 10 | 10 | 10 | 10 |
| $H_2O$ | 0.5 | 0.5 | 0.5 | 0.5 | 0.5 | 0.5 | 0.5 | 0.5 | 0.5 |
| L-5421 | 1.5 | 1.5 | 1.5 | 1.5 | 1.5 | 1.5 | 1.5 | 1.5 | 1.5 |
| TMHDA | 4.0 | 4.0 | 4.0 | 4.0 | 4.0 | 4.0 | 4.0 | 4.0 | 4.0 |
| LL-690D | 0.05 | 0.05 | 0.05 | 0.05 | 0.05 | 0.05 | 0.05 | 0.05 | 0.05 |
| CFC-11 | | | | | | | | | 58 |
| HCFC-123 | 56 | 56 | | | 56 | | 58 | | |
| HCFC-141b | | | 56 | 56 | | 56 | | 57 | |
| Reactivity (sec) (liquid temperature: 20° C.) | | | | | | | | | |
| Creaming time | 8 | 8 | 7 | 8 | 8 | 7 | 9~10 | 9 | 8 |
| Gelatinizing time | 17 | 17 | 16 | 15 | 17 | 15 | 18 | 17 | 16 |
| Density (Kg/m$^3$) | 29.5 | 30 | 29 | 27 | 30 | 28 | 30 | 27 | 27 |
| Low temperature dimentional stability (%) | −1.5 | −0.5 | −0.5 | −1.5 | −1.5 | −0.5 | −6.0 | −5.0 | −1.0 |
| Compressive strength (Kg/cm$^2$) | 2.12 | 2.15 | 2.14 | 2.10 | 2.05 | 2.09 | 1.92 | 1.85 | 2.12 |
| Heat conductivity (Kcal/mhr °C.) | 0.0170 | 0.0172 | 0.0171 | 0.0173 | 0.0171 | 0.0170 | 0.0185 | 0.0183 | 0.0170 |
| Combustibility (Flame resistance) Burned distance (mm) | 35 | 35 | 30 | 30 | 35 | 33 | 40 | 46 | 37 |

(Note)
TCEP: Tris(2-chloroethyl)phosphate
TMHDA: Tetramethylhexamethylene-diamine(catalyst)
LL-690D: Plumbum octoate (catalyst)
Density: ASTM D 1622
Low temp. dimentional stability: JIS A 9514 (−30° C. × 24 hours)
Compressive strength: ASTM D 1621
Heat conductivity: JIS A 1412
Combustibility: ASTM D 1691

Processing properties of polyoxyalkylene polyols of the invention were also evaluated by spray application.

In that test, rigid polyurethane foam composite boards having a face material were prepared by spraying on a surface the formulations of Example 28 and 32 and Comparative Examples 10 and 12 under the following conditions.

| Atomizer | Model - FF Head D Gun (a product of Gusmer Co., Ltd.) |
| --- | --- |
| Output pressure | 50 kg/cm$^2$ |
| Ingredient temperature | 40° C. |
| Face material | Corrogated paper board |

Properties of sprayed rigid foams are illustrated in Table 13.

(B) Polyurethane foam composite having a plurality of face material

Starting material, kind and amount of alkylene oxide added, and hydroxyl value of polyoxyalkylene polyol used for the preparation of the composite are illustrated in Table 10 and Table 11.

Polyoxyalkylene polyols illustrated in Table 10 and Table 11 were used as raw materials.

Foams were prepared according to the formulations illustrated in Table 14 and Table 15. Physical properties such as compressive strength, flame retardancy and thermal conductivity were measured by the same procedures as above. Results are illustrated in Table 14 and Table 15.

Processing properties of polyoxyalkylene polyols of the invention were also evaluated by pouring into a cavity.

TABLE 13

| Example No. | Example 34 | Example 35 | Comparative Example 13 | Comparative Example 14 |
| --- | --- | --- | --- | --- |
| Formulation | (Example 28) | (Example 32) | Comparative Example 10 | Comparative Example 12 |
| Reactivity Tack-free time (sec.) | 4–5 | 4–5 | 6 | 4–5 |
| Sag phenomenon (NOTE) | No | No | Found | No |
| Surface appearance | Good | Good | Good | Good |
| Adhesion | Good | Good | Good | Good |
| Foam density (kg/cm$^3$) | 37 | 37 | 39 | 36 |
| Compressive strength (kg/cm$^2$) | 3.20 | 3.15 | 2.95 | 3.14 |
| Thermal conductivity (kcal/m.hr.°C.) | 0.0170 | 0.0171 | 0.0180 | 0.0170 |

(NOTE) Sag is a phenomenon where a raw material mixture before curing sags or runs down on a vertical surface when the mixture is sprayed to foam on the surface. Other physical properties are tested in accordance with the methods described in Table 8.

In the test, rigid polyurethane foam composite boards having two face materials were prepared with a continuous process under the following conditions by using the formulations of Example 36 and 39 and Comparative Examples of 15 and 19.

| Foaming machine | High pressure foam dispensing machine Model-MQ (a product of Hennecke Machinen Bau) |
| --- | --- |
| Line speed | 10 m/min |
| Temperature | Material 30–40° C. Cure oven 55° C. |
| Product | 1 m Width × 40 mm Thickness 35 mm Foam layer |
| Face material | Laminated paper on the top and bottom surface |

Physical properties of the product are illustrated in Table 16.

As seen in these results, the phenol base polyoxyalkylene polyols of the invention have suitable reactivity. Consequently, the mixture of foaming ingredients does not cause sagging phenomenon, even when it is sprayed on a vertical face material, and can give good appearance on the surface of spray applied foam. Good adhesion of sprayed foam to the face material can also be obtained. The rigid foam thus obtained has excellent flame retardance and low thermal conductivity, and thus provides composite boards having excellent performance.

The formulations used in the preparation of rigid polyurethane foam composites are illustrated in Tables 12 and 14. However, the formulations are not limited to the above embodiments and it is to be understood that the formulations illustrated in Examples 1 to 27 can also be used for the preparation of polyurethane foam composites.

TABLE 14

| | Example | | | | | | | |
| --- | --- | --- | --- | --- | --- | --- | --- | --- |
| | 36 | 37 | 38 | 39 | 40 | 41 | 42 | 43 |
| Formulation (g) | | | | | | | | |
| MDI-CR | 153 | 139 | 153 | 139 | 153 | 72 | 100 | 206 |
| Polyoxyalkylene polyol | | | | | | | | |
| D-6 | 100 | | | | 100 | | | |
| D-5 | | 100 | | | | | | |
| D-7 | | | 100 | | | | | |
| D-8 | | | | 100 | | | | |
| B-4 | | | | | | 100 | | |
| A-6 | | | | | | | 100 | |
| C-4 | | | | | | | | 100 |
| TCEP | 10 | 10 | 10 | 10 | 10 | 10 | 10 | 10 |
| $H_2O$ | 1.2 | 1.2 | 1.2 | 1.2 | 1.2 | 1.2 | 1.2 | 1.2 |
| L-5421 | 1.5 | 1.5 | 1.5 | 1.5 | 1.5 | 1.5 | 1.5 | 1.5 |
| TMHDA | 1.5 | 1.5 | 0.8 | 0.7 | 1.5 | 1.5 | 1.5 | 1.5 |
| HCFC-123 | 60 | 57 | 60 | | | 41 | 47 | 73 |
| HCFC-141b | | | | 52 | 55 | | | |
| Reactivity (sec) (liquid temperature: 20° C.) | | | | | | | | |
| Creaming time | 10 | 10 | 10 | 10 | 10 | 10 | 10 | 10 |
| Gelatinizing time | 67 | 64 | 60 | 61 | 67 | 65 | 62 | 63 |
| Tack-free time | 75 | 73 | 70 | 72 | 73 | 75 | 73 | 74 |
| Density (Kg/m³) | 23 | 23.5 | 23 | 22.5 | 23 | 23 | 23.5 | 22.5 |
| Low temperature dimentional stability (%) | −0.5 | −0.8 | −0.7 | −0.5 | −0.5 | −0.5 | −0.6 | −0.4 |
| Compressive strength (Kg/cm²) | 1.25 | 1.25 | 1.3 | 1.2 | 1.2 | 1.2 | 1.3 | 1.25 |
| Heat conductivity (Kcal/mhr °C.) | 0.0164 | 0.0165 | 0.0162 | 0.0161 | 0.0165 | 0.0165 | 0.0163 | 0.0163 |
| Combustibility (Flame resistance) | | | | | | | | |
| Combustion time (sec) | 22 | 22 | 20 | 26 | 26 | 22 | 24 | 24 |
| Burned distance (mm) | 14 | 15 | 14 | 15 | 16 | 14 | 14 | 15 |

(Note) See Table 12

TABLE 15

| | Comparative Example | | | | |
| --- | --- | --- | --- | --- | --- |
| | 15 | 16 | 17 | 18 | 19 |
| Formulation (g) | | | | | |
| MDI-CR | 140 | 140 | 140 | 140 | 140 |
| Polyoxyalkylene polyol | | | | | |
| D-12 | 50 | 50 | 50 | 50 | 50 |
| D-13 | 50 | | 50 | | 50 |
| D-14 | | 50 | | 50 | |
| TCEP | 10 | 10 | 10 | 10 | 10 |
| $H_2O$ | 1.2 | 1.2 | 1.2 | 1.2 | 1.2 |
| L-5421 | 1.5 | 1.5 | 1.5 | 1.5 | 1.5 |
| TMHDA | 2.8 | 2.8 | 2.8 | 2.8 | 2.8 |
| CFC-11 | | | | | 58 |
| HCFC-123 | 58 | 58 | | | |
| HCFC-141b | | | 53 | 53 | |
| Reactivity (sec) (liquid temperature: 20° C.) | | | | | |
| Creaming time | 13 | 12 | 12 | 12 | 10 |
| Gelatinizing time | 70 | 70 | 68 | 67 | 66 |
| Tack-free time | 88 | 86 | 85 | 85 | 84 |
| Density (Kg/m³) | 23 | 22 | 23 | 22 | 22 |

TABLE 15-continued

|  | Comparative Example | | | | |
|---|---|---|---|---|---|
|  | 15 | 16 | 17 | 18 | 19 |
| Low temperature dimentional stability (%) | −8.2 | −4.0 | −4.2 | −3.5 | −0.5 |
| Compressive strength (Kg/cm$^2$) | 1.04 | 1.05 | 1.02 | 1.03 | 1.3 |
| Heat conductivity (Kcal/mhr °C.) | 0.0174 | 0.0169 | 0.0175 | 0.0170 | 0.0160 |
| Combustibility (Flame resistance) | | | | | |
| Combustion time (sec) | 30 | 30 | 34 | 33 | 31 |
| Burned distance (mm) | 20 | 21 | 20 | 19 | 20 |

(Note) See Table 12

TABLE 16

| Example No. | Example 44 | Example 45 | Comparative Example 20 | Comparative Example 21 |
|---|---|---|---|---|
| Formulation | (Example 36) | (Example 39) | (Comparative Example 15) | (Comparative Example 19) |
| Adhesion between face material and foam | Good | Good | Good | Good |
| Foam density (kg/cm$^3$) | 33 | 31 | 30 | 31 |
| Compressive strength (kg/cm$^2$) | 1.5 | 1.5 | 1.2 | 1.5 |
| Flexural strength (kg/cm$^2$) | 2.3 | 2.3 | 1.8 | 2.3 |
| Thermal conductivity (kcal/m.hr.°C.) | 0.0170 | 0.0170 | 0.0180 | 0.0170 |

(NOTE) Test method is the same as described in Table 8.

What is claimed is:

1. A rigid polyurethane foam obtained by reacting an organic polyisocyanate, in the presence of a foaming agent, catalyst, and cell regulator with a combination of polyoxyalkylene polyols selected from:

polyoxyalkylene polyol (a) having a hydroxyl value of from 145 to 350 mgKOH/g and prepared by the addition of from 1.0 to 4.5 moles of an alkylene oxide to one mole of hydroxyl of a phenol resin having a number average molecular weight of from 650 to 1400 and an average functionality of from 3 to 8 and represented by formula (I):

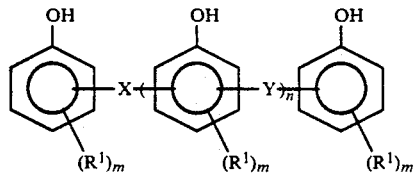

wherein $R^1$ is a hydrogen atom, alkyl having 1 to 9 carbon atoms, halogen atom selected from chlorine, bromine and fluorine, hydroxyl, methoxy, ethoxy or a butoxy, m is an integer of from 1 to 3; n is an integer of from 1 to 6; X is a divalent group selected from the group consisting of —CR$_1$R$_2$—, xylylene, oxy, thio, dithio and a sulfonyl; and Y is one or more bridge group selected from the above divalent groups; and wherein R$_1$ and R$_2$ are a hydrogen atom, alkyl having from 1 to 6 carbon atoms, alicyclic hydrocarbon group or an aromatic hydrocarbon group;

polyoxyalkylene polyol (b) having a hydroxyl value of from 240 to 800 mgKOH/g and obtained by the addition of from 0.5 to 3.0 moles of an alkylene oxide to one atom of an active hydrogen of an alkanolamine which is a single compound or a mixture of two or more compounds selected from the group consisting of compounds represented by formula (II):

$$NR_1'R_1'R_2' \qquad (II)$$

wherein $R_1'$ and $R_2'$ are an atom or a group selected from the group consisting of a hydrogen atom, —CH$_2$CH$_2$OH group, and —CH$_2$CH(CH$_3$)OH group, excluding the case wherein both $R_1'$ and $R_2'$ are a hydrogen atom; and polyoxyalkylene polyol (c) having a hydroxyl value of from 130 to 750 mgKOH/g and obtained by the addition of from 0.8 to 6.5 moles of an alkylene oxide to one mole of a hydroxyl of an aliphatic polyhydroxy compound which is a single compound or a mixture of two or more compounds selected from the group consisting of a glycol, polyhydric alcohol and a polysaccharide having from 2 to 8 functionality;

wherein said combination of polyoxyalkylene polyols is a combination of (a) and (b) having a weight ratio (a)/(b) of from 0.25 to 4.0 and a hydroxyl value of from 180 to 700 mgKOH/g or a combination of (a) and (c) having a weight ratio (a)/(c) of from 0.1 to 4.0 and hydroxyl value of from 180 to 700 mgKOH/g, and said foaming agent is a hydrochlorofluorocarbon or a foaming agent mixture containing same.

2. The rigid polyurethane foam of claim 1 wherein the phenol resin is a novolak resin represented by the formula (I) wherein $R^1$ is a hydrogen atom, m is 1, and both X and Y are —CH$_2$— group.

3. The rigid polyurethane foam of claim 2 wherein the novolak resin has an average molecular weight of from 650 to 900, an average functionality of from 3 to 8, and a softening point of from 75° to 115° C.

4. The rigid polyurethane foam of claim 1 wherein the hydrochlorofluoroacarbon is 2,2-dichloro-1,1,1-trifluoroethane or 1,1-dichloro-1-fluoroethane.

5. The rigid polyurethane foam of claim 1 wherein the organic polyisocyanate is an isocyanate terminated prepolymer obtained by previously reacting the whole amount or a portion of said organic polyisocyawnate with an active hydrogen containing compound in the equivalent ratio of NCO/active hydrogen which is in the range of from 2.0 to 5.0.

6. The rigid polyurethane foam of claim 1 wherein the equivalent ratio of the isocyanate group in the organic polyisocyanate to the active hydrogen atom in the foaming ingredients is in the range of from 0.8 to 5.0.

7. A process for the preparation of a rigid polyurethane foam by reacting an organic polyisocyanate, in the presence of a foaming agent, catalyst, and cell regulator with a combination of polyoxyalkylene polyols selected from:

polyoxyalkylene polyol (a) having a hydroxyl value of from 145 to 350 mgKOH/g and prepared by the addition of from 1.0 to 4.5 moles of an alkylene oxide to one mole of hydroxyl of a phenol resin having a number average molecular weight of from 650 to 1400 and an average functionality of from 3 to 8 and represented by formula (I):

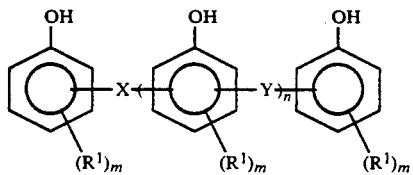

wherein $R^1$ is a hydrogen atom, alkyl having from 1 to 9 carbon atoms, halogen atom selected from chlorine, bromine and fluorine, hydroxyl, methoxy, ethoxy or a butoxy; m is an integer of from 1 to 3; n is an integer of from 1 to 6; X is a divalent group selected from the group consisting of —$CR_1R_2$—, xylylene, oxy, thio, dithio and a sulfonyl; and Y is one or more bridge group selected from the above divalent groups; and wherein $R_1$ and $R_2$ are a hydrogen atom, alkyl having from 1 to 6 carbon atoms, alicyclic hydrocarbon group or an aromatic hydrocarbon group;

polyoxyalkylene polyol (b) having a hydroxyl value of from 240 to 800 mgKOH/g and obtained by the addition of from 0.5 to 3.0 moles of an alkylene oxide to one atom of an active hydrogen of an alkanolamine which is a single compound or a mixture of two or more compounds selected from the group consisting of compounds represented by formula (II):

$$NR_1'R_1'R_2' \quad (II)$$

wherein $R_1'$ and $R_2'$ are an atom or a group selected from the group consisting of a hydrogen atom, —$CH_2CH_2OH$ group, and —$CH_2CH(CH_3)OH$ group, excluding the case wherein both $R_1'$ and $R_2'$ are a hydrogen atom; and polyoxyalkylene polyol (c) having a hydroxyl value of from 130 to 750 mgKOH/g and obtained by the addition of from 0.8 to 6.5 moles of an alkylene oxide to one mole of a hydroxyl of an aliphatic polyhydroxy compound which is a single compound or a mixture of two or more compounds selected from the group consisting of a glycol, polyhydric alcohol and a polysaccharide having from 2 to 8 functionality;

wherein said combination of polyoxyalkylene polyol is a combination of (a) and (b) having a weight ratio (a)/(b) of from 0.25 to 4.0 and a hydroxyl value of from 180 to 700 mgKOH/g or a combination of (a) and (c) having a weight ratio (a)/(c) of from 0.1 to 4.0 and a hydroxyl value of from 180 to 700 mgKOH/g, and said foaming agent is a hydrochlorofluorocarbon or a foaming agent mixture containing same.

8. The process of claim 7 wherein the phenol resin is a novolak resin represented by the formula (I) wherein $R^1$ is a hydrogen atom, m is 1, and both X and Y are —$CH_2$— group.

9. The process of claim 8 wherein the novolak resin has an average molecular weight of from 650 to 900, an average functionality of from 3 to 8, and a softening point of from 75° to 115 °C.

10. The process of claim 7 wherein the hydrochlorofluorocarbon is 2,2-dichloro-1,1,1-trifluoroethane or 1,1-dichloro-1-fluoroethane.

11. The process of claim 7 wherein the organic polyisocyanate is an isocyanate terminated prepolymer obtained by previously reacting the whole amount or a portion of said organic polyisocyanate with an active hydrogen containing compound in the equivalent ratio of NCO/active hydrogen which is in the range of from 2.0 to 5.0.

12. The process of claim 7 wherein the equivalent ratio of the isocyanate group in the organic polyisocyanate to the active hydrogen atom in the foaming ingredients is in the range of from 0.8 to 5.0.

13. A process for the preparation of a rigid polyurethane foam composite by spraying a mixture of raw materials on a substrate or pouring thereof into a cavity surrounded with a plurality of face materials and successively reacting an organic polyisocyanate, in the presence of a foaming agent, catalyst, and cell regulator with a combination of polyoxyalkylene polyols selected from:

polyoxyalkylene polyol (a) having a hydroxyl value of from 145 to 350 mgKOH/g and prepared by the addition of from 1.0 to 4.5 moles of an alkylene oxide to one mole of hydroxyl of a phenol resin having a number average molecular weight of from 650 to 1400 and an average functionality of from 3 to 8 and represented by formula (I):

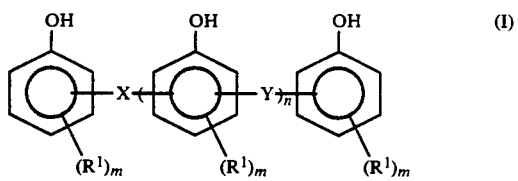

wherein $R^1$ is a hydrogen atom alkyl having from 1 to 9 carbon atoms, halogen atom selected from chlorine, bromine and fluorine, hydroxyl, methoxy, ethoxy or a butoxy; m is an integer of from 1 to 3; n is an integer of from 1 to 6; X is a divalent group selected from the group consisting of —$CR_1R_2$—, xylyene, oxy, thio, dithio and a sulfonyl; and Y is one or more of bridge group selected from the above divalent groups; and wherein $R_1$ and $R_2$ are a hydrogen atom, alkyl having from 1 to 6 carbon atoms, alicyclic hydrocarbon group or an aromatic hydrocarbon group;

polyoxyalkylene polyol (b) having a hydroxyl value of from 240 to 800 mgKOH/g and obtained by the addition of from 0.5 to 3.0 moles of an alkylene oxide to one atom of an active hydrogen of an alkanolamine which is a single compound or a mixture of two or more compounds selected from the group consisting of compounds represented by formula (II):

$$NR_1'R_1'R_2' \qquad (II)$$

wherein $R_1'$ and $R_2'$ are an atom or a group selected from the group consisting of a hydrogen atom, —$CH_2CH_2OH$ group, and —$CH_2CH(CH_3)OH$ group, excluding the case wherein both $R_1'$ and $R_2'$ are a hydrogen atom; and polyoxyalkylene polyol (c) having a hydroxyl value of from 130 to 750 mgKOH/g and obtained by the addition of from 0.8 to 6.5 moles of an alkylene oxide to one mole of hydroxyl of an aliphatic polyhydroxy compound which is a single compound or a mixture of two or more compounds selected from the group consisting of a glycol, polyhydric alcohol and a polysaccharide having from 2 to 8 functionality;

wherein said combination of polyoxyalkylene polyols is a combination of (a) and (b) having a weight ratio (a)/(b) of from 0.25 to 4.0 and a hydroxyl value of from 180 to 700 mgKOH/g or a combination of (a) and (c) having a weight ratio (a)/(c) of from 0.1 to 4.0 and a hydroxyl value of from 180 to 700 mgKOH/g, and said foaming agent is a hydrochlorofluorocarbon or a foaming agent mixture containing same.

14. The process of claim 13 wherein the plurality of face materials is a pair of face materials situated with a spacing.

15. The process of claim 13 wherein the plurality of face materials is a top, a bottom and a plurality of side face materials.

16. The process of claim 13 wherein the plurality of face materials is a bottom and a plurality of side face materials.

17. The process of claim 13 wherein the method of formation of the rigid polyurethane foam in cavity surrounded with a plurality of face materials is spreading, pouring or spraying.

18. The process of claim 13 wherein the method of formation of rigid polyurethane foam on a substrate is spraying.

19. The process of claim 13 wherein the phenol resin is a novolak resin represented by the formula (I) wherein $R^1$ is a hydrogen atom, m is 1, and both X and Y are —$CH_2$— group.

20. The process of claim 19 wherein the novolak resin has an average molecular weight of from 650 to 900, an average functionality of from 3 to 8, and a softening point of from 75° to 115° C.

21. The process of claim 13 wherein the hydrochlorofluorocarbon is 2,2-dichloro-1,1,1-trifluoroethane or 1,1-dichloro-1-fluoroethane.

22. The process of claim 13 wherein the organic polyisocyanate is an isocyanate terminated prepolymer obtained by previously reacting the whole amount or a portion of said organic polyisocyanate with an active hydrogen containing compound in the equivalent ratio of NCO/active hydrogen which is in the range of from 2.0 to 5.0.

23. The process of claim 13 wherein the equivalent ratio of the isocyanate group in the organic polyisocyanate to the active hydrogen atom in the foaming ingredients is in the range of from 0.8 to 5.0.

* * * * *

UNITED STATES PATENT AND TRADEMARK OFFICE
CERTIFICATE OF CORRECTION

PATENT NO. : 5,107,068
DATED : April 21, 1992
INVENTOR(S) : Ozaki et al.

It is certified that error appears in the above-identified patent and that said Letters Patent is hereby corrected as shown below:

In column 34, line 63, amend "hydrochlorofluoroacarbon" to --hydrochlorofluorocarbon--.

In column 34, line 68, amend "polyisocyawnate" to --polyisocyanate--.

Signed and Sealed this

Twenty-first Day of September, 1993

Attest:

BRUCE LEHMAN

Attesting Officer     Commissioner of Patents and Trademarks